(12) United States Patent
Luo et al.

(10) Patent No.: US 7,181,452 B1
(45) Date of Patent: Feb. 20, 2007

(54) LOCKING MECHANISM USING PREDEFINED LOCKS FOR AGGREGATE MATERIALIZED VIEWS IN A DATABASE SYSTEM

(75) Inventors: Gang Luo, Madison, WI (US); Michael W. Watzke, Madison, WI (US); Curt J. Ellmann, Madison, WI (US)

(73) Assignee: NCR Corp., Dayton, OH (US)

( * ) Notice: Subject to any disclaimer, the term of this patent is extended or adjusted under 35 U.S.C. 154(b) by 327 days.

(21) Appl. No.: 10/324,456

(22) Filed: Dec. 20, 2002

Related U.S. Application Data

(63) Continuation-in-part of application No. 10/117,497, filed on Apr. 4, 2002.

(51) Int. Cl.
*G06F 17/30* (2006.01)

(52) U.S. Cl. .......................... 707/8; 707/101
(58) Field of Classification Search ............... 707/1, 707/2, 3, 4, 5, 6, 7, 8, 9, 10, 100, 200, 201, 707/202, 203, 103 R, 104.1; 710/200; 717/140; 718/102; 395/425
See application file for complete search history.

(56) References Cited

U.S. PATENT DOCUMENTS

| | | | | |
|---|---|---|---|---|
| 5,261,069 A | | 11/1993 | Wilkinson et al. ........... 395/425 |
| 5,983,215 A | | 11/1999 | Ross et al. ..................... 707/2 |
| 6,353,828 B1 | * | 3/2002 | Ganesh et al. ................ 707/8 |
| 6,353,835 B1 | | 3/2002 | Lieuwen ...................... 707/203 |
| 6,353,836 B1 | * | 3/2002 | Bamford et al. ............. 707/203 |
| 6,581,205 B1 | * | 6/2003 | Cochrane et al. ........... 717/140 |
| 6,668,295 B1 | | 12/2003 | Chan .......................... 710/200 |
| 6,687,709 B2 | * | 2/2004 | Williams ................ 707/103 R |
| 6,708,195 B1 | * | 3/2004 | Borman et al. ............. 718/102 |
| 6,754,656 B1 | | 6/2004 | Cornwell et al. .............. 707/8 |

OTHER PUBLICATIONS

Rick Grehan, "How to Climb a B-tree: B-tree, a popular tree-indexing structure, is perfect for db4o database system, and can save you a lot of disk access time," printed from http://www.fawcette.com, 25 pages (dated as early as Jan. 8, 2003).

Kevin Jones, "TPFDF B+Tree Indexing Support," printed from http://www-3.ibm.com, pp. 1-3 (dated as early as Jan. 8, 2003).

SAP Library-User Manual: SAP DB, "B*Tree," printed from http://pipin.tmd.ns.ac.yu, pp. 1-2 (dated as early as Jan. 8, 2003).

(Continued)

*Primary Examiner*—Jeffrey Gaffin
*Assistant Examiner*—Yicun Wu
(74) *Attorney, Agent, or Firm*—Trop, Pruner & Hu, P.C.; Adam Bennett

(57) ABSTRACT

A database system includes a locking mechanism for an aggregate materialized view defined on base relations. In response to updates of a base relation, predefined locks are placed on the aggregate materialized view. With locking mechanisms, transaction concurrency is enhanced by enabling concurrent updates of the materialized view by plural transactions in certain cases, while avoiding the situation in which multiple tuples belonging to the same group are integrated as separate tuples into the aggregate materialized view.

31 Claims, 13 Drawing Sheets

OTHER PUBLICATIONS

Gang Luo et al., "Locking Protocols for Materialized Aggregate Join Views," pp. 1-11 (Jun. 2003).

B.R. Badrinath et al, "Semantics-Based Concurrency Control: Beyond Commutativity," TODS pp. 163-199 (1992).

D. Gawlick et al., "Varieties of Concurrency Control in IMS/VS Fast Path," Database Engineering Bulletin, pp. 3-10 (1985).

J. Gray et al., "Granularity of Locks and Degrees of Consistency in a Shared Data Base," IFIP Working Conference on Modeling in Data Base Management Systems, pp. 365-394 (1976).

J. Gray et al., "Transaction Processing: Concepts and Techniques," Morgan Kaufmann Publishers, pp. 403-406, 409-411, 413, 414, 419, 428, 429, 456-458, 464-481, 848-851, 868-872 (1993).

A. Kawaguchi et al., "Concurrency Control Theory for Deferred Materialized Views," ICDT pp. 306-320 (1997).

H.F. Korth, "Locking Primitives in a Database System," JACM pp. 55-79 (1983).

W. Labio et al., "Performance Issues in Incremental Warehouse Maintenance," VLDB pp. 461-472 (2000).

P.E. O'Neil, "The Escrow Transactional Method," TODS pp. 405-430 (1986).

M. Poess et al. "New TPC Benchmarks for Decision Support and Web Commerce," SIGMOD pp. 64-71 (2000).

R.F. Resende et al., "Semantic Locking in Object-Oriented Database Systems," OOPSLA, pp. 388-402 (1994).

A. Reuter, "Concurrency on High-traffic Data Elements," PODS, pp. 83-92 (1982).

M. Komacker et al, "Concurrency and Recovery in Generalized Search Trees," SIGMOD pp. 62-72 (1997).

D.B. Lomet, "Key Range Locking Strategies for Improved Concurrency," VLDB pp. 655-644 (1993).

C. Mohan, "A Key-Value Locking Method for Concurrency Control of Multiaction Transactions Operating on B-Tree Indexes," VLDB, pp. 392-405 (1990).

C. Mohan, "Commit_LSN: A Novel and Simple Method for Reducing Locking and Latching in Transaction Processing Systems," VLDB pp. 406-418 (1990).

* cited by examiner

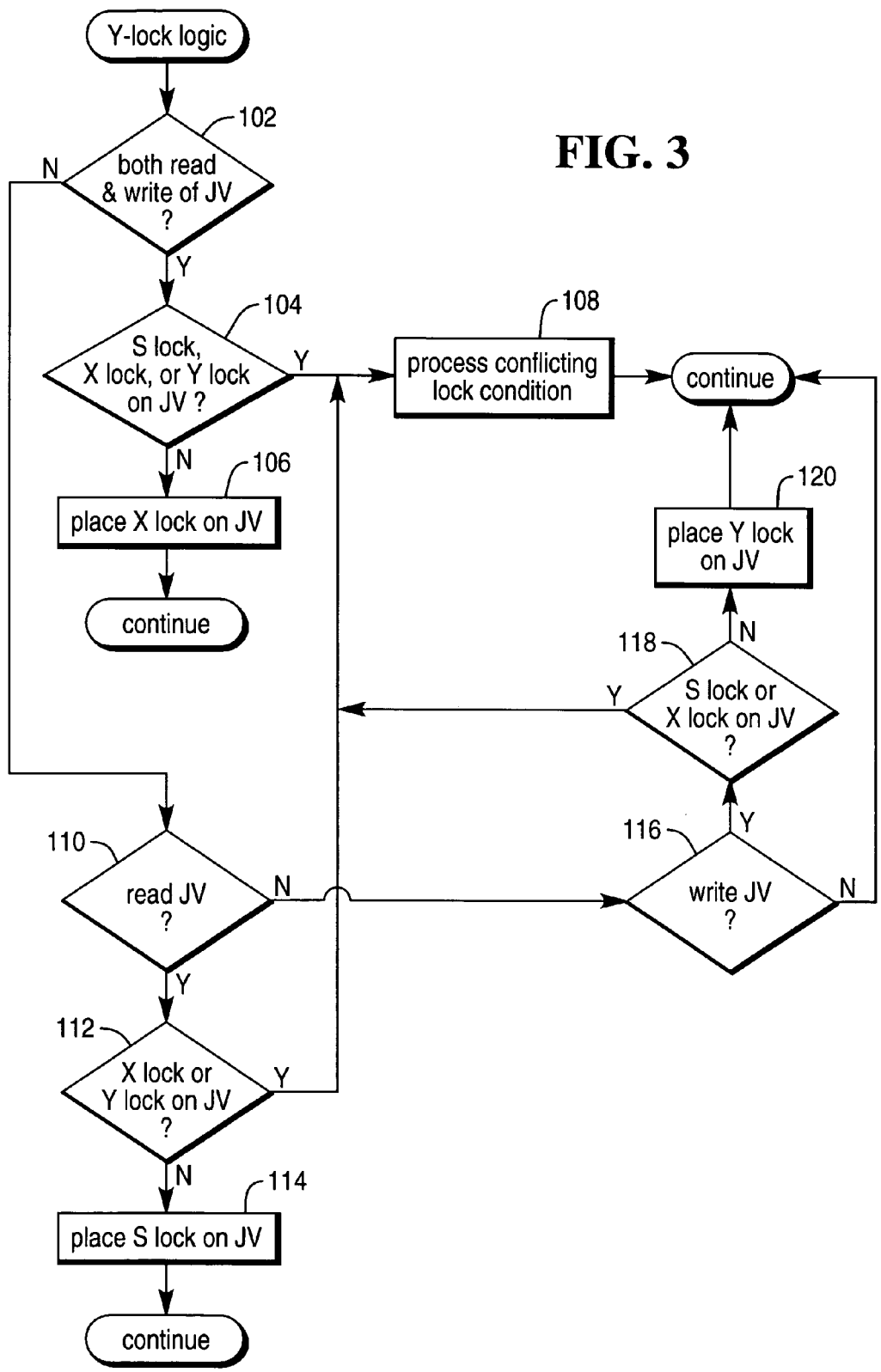

FIG. 4C initial:

AJV

| A.a | SUM(b.d) |
|-----|----------|
| 1   | 3        | virtual JV

| A.a | B.d |
|-----|-----|
| 1   | 3   | insert (1,1), (1,5)

AJV

| A.a | SUM(b.d) |
|-----|----------|
| 1   | 9        | virtual JV

| A.a | B.d |
|-----|-----|
| 1   | 3   |
| 1   | 1   |
| 1   | 5   |

FIG. 14

| | relation A | | relation B | | aggregate join view AJV | | virtual join view JV' | | | |
|---|---|---|---|---|---|---|---|---|---|---|
| | a | c | | d | e | | a | sum(e) | a | c | d | e |
| $t_{A1}$ | 1 | 4 | $t_{B1}$ | 4 | 1 | $t_{JV1}$ | 1 | 1 | ----- $t'_{JV1}$ | 1 | 4 | 4 | 1 |
| | | | $t_{B2}$ | 5 | 2 | | | | | | | |
| | | | $t_{B3}$ | 6 | 4 | | | | | | | |

FIG. 15 relation A: $t_{A1}$ (a=1, c=4), $t_{A2}$ (a=1, c=5)

relation B: $t_{B1}$ (d=4, e=1), $t_{B2}$ (d=5, e=2), $t_{B3}$ (d=6, e=4)

aggregate join view AJV: $t_{JV1}$ (a=1, sum(e)=3)

virtual join view JV': $t'_{JV1}$ (1,4,4,1), $t'_{JV2}$ (1,5,5,2)

FIG. 16 relation A: $t_{A1}$ (1,4), $t_{A2}$ (1,5), $t_{A3}$ (1,6)

relation B: $t_{B1}$ (4,1), $t_{B2}$ (5,2), $t_{B3}$ (6,4)

aggregate join view AJV: $t_{JV1}$ (a=1, sum(e)=7)

virtual join view JV': $t'_{JV1}$ (1,4,4,1), $t'_{JV2}$ (1,5,5,2), $t'_{JV3}$ (1,6,6,4)

LOCKING MECHANISM USING PREDEFINED LOCKS FOR AGGREGATE MATERIALIZED VIEWS IN A DATABASE SYSTEM

CROSS REFERENCE TO RELATED APPLICATIONS

This is a continuation-in-part of U.S. Ser. No. 10/117,497, filed Apr. 4, 2002.

BACKGROUND

A database is a collection of stored data that is logically related and that is accessible by one or more users. A popular type of database is the relational database management system (RDBMS), which includes relational tables made up of rows and columns. Each row represents an occurrence of an entity defined by a table, with an entity being a person, place, or thing about which the table contains information. To extract data from, or to update, a relational table, queries according to a standard database query language (e.g., Structured Query Language or SQL) are used. A table (also referred to as a relation) is made up of multiple rows (also referred to as tuples). Each row (or tuple) includes multiple columns (or attributes).

Various other data structures are also typically associated with relations in a relational database system. For example, a view is a derived relation formed by performing a function on one or more base relations. Rather than storing the view, the function is typically recomputed each time the view is referenced. This type of view is referred to as an "ordinary view."

Unlike an ordinary view, a materialized view is a pre-computed, stored query result that can be used for some queries instead of reconstructing the results directly from the base relations. As with the ordinary view, a function is performed on the base relations to derive the materialized view. However, because the materialized view is stored, fast access to the data is possible without recomputing the view.

After the materialized view is created, subsequent queries are able to use the materialized view, where appropriate, to increase query processing speed. Materialized views can be used to assemble data that come from many different relations. One type of view is the join view, which stores join results of multiple base relations.

A materialized view is updated when the underlying base relations are modified. As the base relations are changed through insertion of new tuples, deletion of tuples, or updates to existing tuples, the corresponding rows in the materialized view are changed to avoid becoming stale. This is known as materialized view maintenance.

Relational database systems can be used for data warehouse applications. A data warehouse collects information from several source databases. The collected information is integrated into a single database to be queried by the data warehouse clients.

Traditionally, data warehouses have been archival stores used for analysis of historical data. More recently, however, there has been a growing trend to use a data warehouse operationally (referred to as a "operational data warehouse" or "real-time data warehouse"), which involves making relatively real-time decisions about data stored in the data warehouse.

Traditional techniques of maintaining views are usually inadequate (in terms of processing speed) for operational data warehouses due to the real-time update requirements. Furthermore, materialized view maintenance in an operational data warehouse requires transactional consistency. If transactional consistency is enforced by traditional concurrency control mechanisms (including locking mechanisms), the ability of the database system to perform concurrent transactions may be reduced. This hurts performance in a database system, especially in a parallel database system having multiple processing modules.

When a base relation is updated (e.g., new row inserted, existing row deleted, or row modified), the update needs to be propagated to a materialized view as part of the materialized view maintenance. In some systems, to increase operational speeds, reduced levels of consistency are used that allow "dirty reads," which are reads of stale data in relations. However, when such reduced levels of consistency are used in an environment in which materialized views are present, inconsistent query results are often obtained as a result of inaccurate data being captured in materialized views.

SUMMARY

In general, a method and apparatus are provided to improve concurrency control in a database system in which materialized views are maintained while avoiding the integration of multiple tuples belonging to the same group as separate tuples in a materialized view. This is accomplished by defining predetermined locks that have predefined strengths.

Other or alternative features will become more apparent from the following description, from the drawings, and from the claims.

BRIEF DESCRIPTION OF THE DRAWINGS

FIG. 3 is a flow diagram of logic for a Y-lock locking mechanism according to one embodiment for join view maintenance.

FIGS. 4A–4C illustrate example join views based on multiple base relations with projection or aggregation applied.

FIGS. 14–16 illustrate the content of base relations and an aggregate join view in an example.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

I. Introduction

In accordance with some embodiments of the invention, a locking mechanism for materialized views (such as join views) is provided in a relational database system. A common form of materialized view is the join view, which is a view that stores and maintains the result of a join of multiple base relations (also referred to as "base tables"). However, locking mechanisms described here can be extended to other types of views.

The following provides an example query for creating a join view (JV) on two base relations (A, B):

CREATE JOIN VIEW JV AS
SELECT *
FROM A, B
WHERE A.c=B.d
PARTITIONED ON A.e;

The join view JV includes tuples (also referred to as "rows") of base relations A and B where the attributes (also referred to as "columns") A.c and B.d are equal. The join view JV is partitioned on the attribute A.e. In other examples, a join view can be stored for a join of more than two base relations. In the following description, the terms "table" and "relation" are used interchangeably. Also, a table or relation has rows (or tuples) and columns (or attributes). The terms "row" and "tuple" are used interchangeably, and the terms "column" and "attribute" are used interchangeably.

Figure 1:
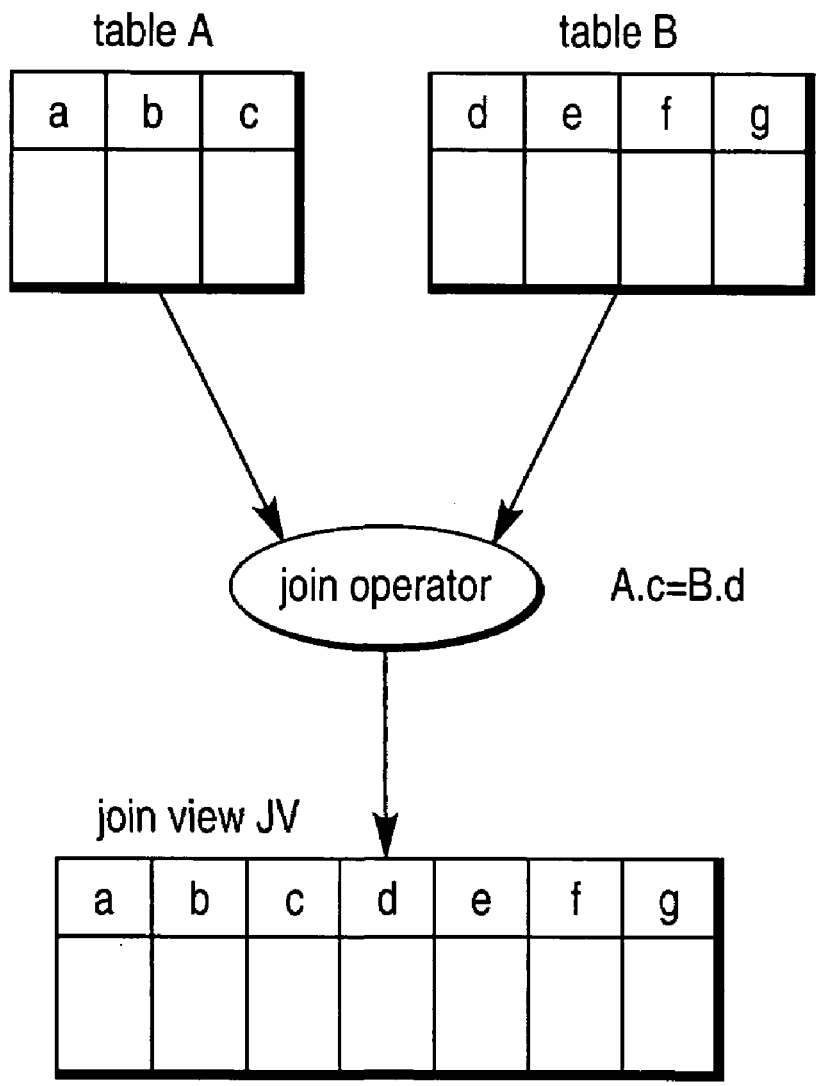
FIG. 1 illustrates an example join view based on multiple base relations.

The join relations A and B and the join view JV created as a result of the query is shown in FIG. 1. Relation A has attributes a, b, c, and relation B has attributes d, e, f, g. The "SELECT *" clause selects all attributes of relations A and B for insertion into the join view JV (which contains attributes a, b, c, d, e, f, g). Note that less than all attributes of relations A and B can be projected into the join view JV, in which case less than all of the attributes a, b, c, d, e, f, g, are stored in the join view JV.

Another type of join view is an aggregate join view, which stores join results of a join of multiple base relations, with the join results grouped by one or more grouping attributes and the grouped rows aggregated on one or more attributes. As one example, an aggregate join view can be created as follows:

CREATE AGGREGATE JOIN VIEW AJV AS
SELECT A.a, SUM (A.b)
FROM A, B
WHERE A.c=B.d
GROUP BY A.a;

The grouping attribute specified in the example query is A.a. This causes rows of the join result to be grouped according to different values of A.a. The aggregate operator specified in the example query is SUM, which causes the values of A.b of rows that are combined into each group to be summed.

There are various different types of locks that can be placed on data stored in relational tables to restrict access to or the ability to modify the data. Table-level locks are placed on an entire table or relation. Table-level locks include a table-level shared (S) lock and a table-level exclusive (X) lock. Generally, once placed on a table, a table-level S lock blocks a subsequent transaction that attempts to write to any part of the table. A table-level X lock placed on a table is more restrictive, as it blocks any subsequent transaction that attempts to read from or write to any part of the table.

While a table-level locking mechanism locks an entire table, a value locking mechanism locks only a portion of a table. The value locking mechanism specifies a value (or values) of an attribute(s) in a table for which locks are to be placed. Such an attribute, or attributes, is referred to as a value locking attribute, or value locking attributes. A value locking mechanism usually locks only one row or a few rows.

Value locks include a shared (S) value lock and an exclusive (X) value lock. To place an X value lock on an attribute value of a base relation R, a table-level intention exclusive (IX) lock is first placed on R. Similarly, to place an S value lock on an attribute value of the base relation R, a table-level intention shared (IS) lock is first placed on R.

A table-level IX lock is placed on a relation to prevent any subsequent table-level X or S locks on the same relation. The IX lock is a mechanism for the database system to efficiently determine whether a subsequent table-level X or S lock can be placed, without having to find out if there is a conflicting value lock on the relation. For example, suppose the value locking attribute of a relation R is attribute R.a. There can potentially be multiple value locks placed on multiple values of R.a. Thus, a first X value lock can be placed on row(s) of the relation R with R.a=5, a second X value lock can be placed on row(s) of relation R with R.a=2, and so forth. If a subsequent transaction attempts to read the entire relation R, the subsequent transaction will need to acquire a table-level S lock. One way to determine if the table-level lock S lock can be granted is by finding each R.a value for which there is an X value lock. However, this is inefficient. Instead, according to some embodiments, a table-level IX lock is placed on the relation R if there is at least one X value lock on the base relation R. Thus, to determine if the table-level S lock can be placed on the relation R, the database system can quickly detect that there is already an IX lock placed on the relation R, which blocks acquisition of the table-level S lock. Note that only one IX lock is needed for multiple X value locks of a relation. The IX lock also blocks any subsequent table-level X lock.

Similarly, a table-level IS lock placed on a relation R for an S value lock blocks any subsequent table-level X lock.

If a transaction T attempts to update base relation R, the transaction has two choices: (1) T can place a table-level X lock on base relation R; or (2) T can place an IX lock on R and an X value lock on some value locking attribute of R. Similarly, if transaction T attempts to read base relation R, transaction T also has two choices: (1) T can place a table-level S lock on R; or (2) T can place an IS lock on R and an S value lock on some value locking attribute of R.

If materialized views are also stored in the database system, a locking mechanism is also provided for the materialized view. In one embodiment, a "Y-lock" locking mechanism is provided for the materialized view. As a further enhancement to the Y-lock locking mechanism, a "W value lock" (also referred to as W-lock) locking mechanism is also provided to enable proper updates of an aggregate join view by multiple transactions. In another embodiment, a "no-lock" locking mechanism is provided for the materialized view.

II. Example Database System Arrangement

Figure 2:
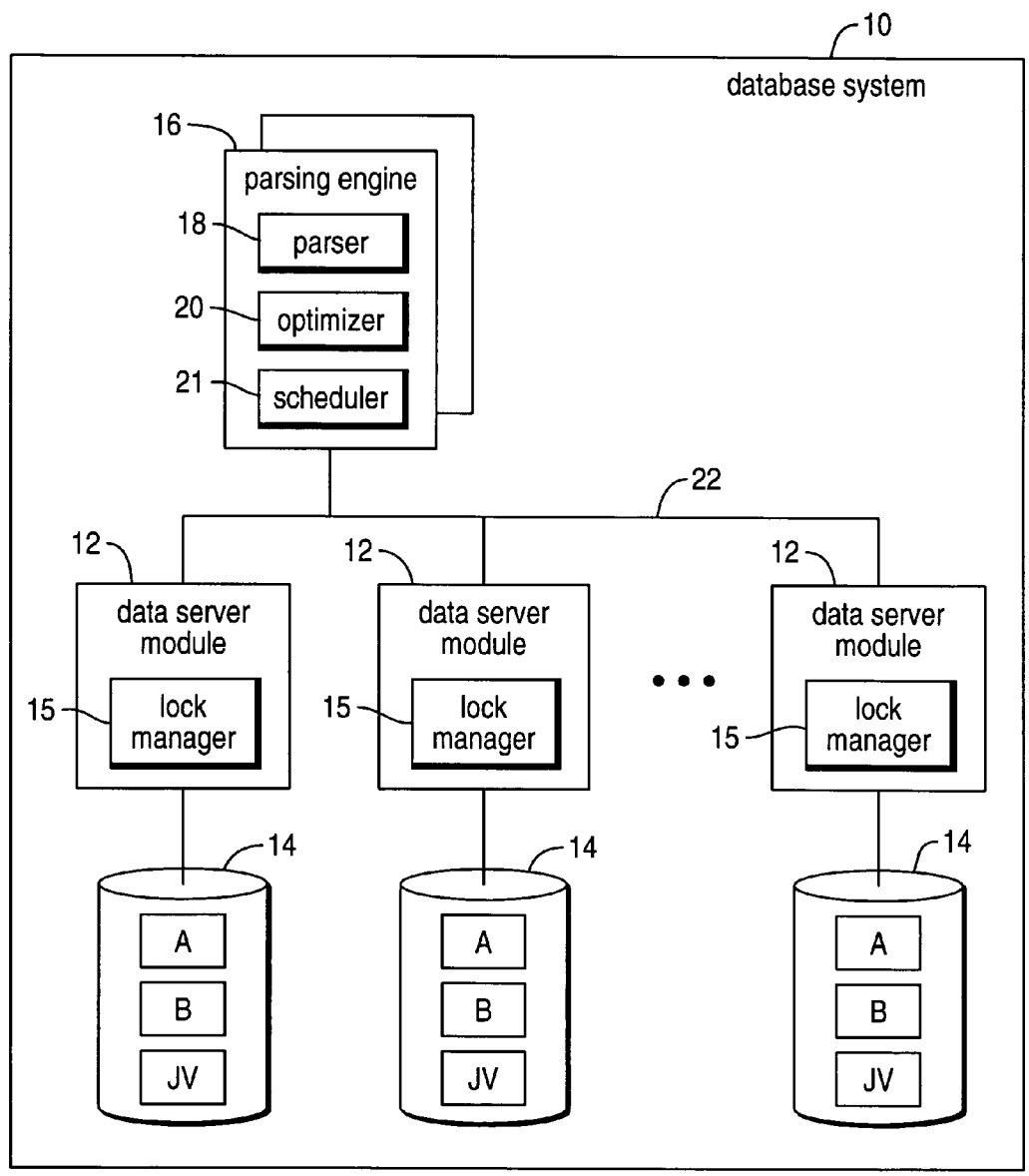
FIG. 2 is a block diagram of an example arrangement of a database system.

FIG. 2 shows an example arrangement of a database system 10 that stores base relations (e.g., A, B) and join views (e.g., JV). The database system 10 is a parallel database system having a plurality of data server modules 12. Each data server module 12 is responsible for managing the access to or modification of data stored in a respective storage module 14. Examples of the responsibilities of each data server module (also referred to as "an access module") include locking databases, tables, or portions of tables; creating, modifying, or deleting definitions of tables; inserting, deleting, or modifying rows within tables; and retrieving information from definitions and tables. The data server modules, after executing an action, also return responses to a requesting client. In one example implementation, the data server modules 12 are based on access module processors (AMPs) in TERADATA® database systems from NCR Corporation.

According to one embodiment, each data server module 12 includes a lock manager 15 to provide a locking mechanism according to some embodiments of the invention. Thus, the lock manager 15 is responsible for placing locks (e.g. table-level locks or value locks) on base relations and join views. As shown, the locking mechanism is distributed across plural data server modules 12. Alternatively, a centralized lock manager is employed.

In one embodiment, the requesting client that sends commands to the data server modules 12 include one or more parsing engines 16. The parsing engine(s) 16 receive requests from users or applications, which are in the form of queries according to a standard database query language (such as a Structured Query Language or SQL, as provided by the American National Standards Institute or ANSI). In other embodiments, other types of database query languages can be used.

Each parsing engine 16 includes a parser 18 and an optimizer 20. The parser 18 checks a received request for proper syntax and semantically evaluates the request. The optimizer 20 develops an execution plan for the received request. In some embodiments, the optimizer 20 uses a cost-based mechanism to select a least expensive (in terms of system resources utilized) execution plan for the query.

The execution plan includes a series of "steps" that are communicated to one or more of the data server modules 12 over a communications network 22. If the execution plan can be executed by one data server module 12, then the parsing engine 16 sends the one or more steps of the execution plan to the one data server module 12. However, if plural data server modules 12 are involved in the execution plan, the parsing engine 16 sends the step(s) to the plural data server modules 12. The sequence in which steps of an execution plan are executed is controlled by a scheduler 21 in the parsing engine 16.

In the example shown in FIG. 2, base relations A and B are stored in plural storage modules 14 associated with corresponding data server modules 12. Each base relation A or B is partitioned into plural partitions based on one or more selected attributes (referred to as the primary index) of the base relation. Each partition stored on a respective storage module 14 includes a subset of all the rows of the base relation. A join view (JV), such as a join view based on a join of tables A and B, is also partitioned across the plurality of storage modules 14. In the example join view CREATE statement above, the join view is partitioned on attribute A.e of base relation A. Thus, a first partition of the join view JV is stored on a first storage module 14 based on some value(s) of A.e; a second partition of JV is stored on a second storage module 14 base on some other value(s) of A.e; and so forth.

Although the storage modules 14 are shown as separate modules, they can be part of the same storage subsystem. Alternatively, the storage modules 14 can be separate storage devices. In another embodiment, instead of plural data server modules 12, the database system 10 can include only one data server module 12. The locking mechanism according to the various embodiments can be applied to a single-data server module database system rather than the multiple-data server module database system shown in FIG. 2.

III. Y-Lock Locking Mechanism

In accordance with one embodiment of the invention, the locking mechanism provided for the join view is a "Y-lock" locking mechanism. A join view can refer to either an aggregate join view or a non-aggregate join view. A Y lock has similar functionality as an X lock, with the major difference being that the Y lock does not conflict with itself. In other words, the Y lock is a modified type of exclusive lock placed on a join view that allows subsequent Y locks to be placed on the same join view even though a first Y lock is still active on the join view. In contrast, a table-level X lock placed on a join view blocks a subsequent X lock on the same join view. By enabling multiple Y locks to be concurrently placed on the same join view, throughput of transactions in the database system 10 can be greatly increased, as the possibility of lock conflicts on the join views among different transactions is reduced. A Y lock is also referred to as a "modified-exclusive" lock.

Three types of table-level locks are allowed on a join view (JV): Y locks, S locks, and X locks. The conditions under which such table-level locks are allowed are shown by the logic of FIG. 3. The logic shown in FIG. 3 is performed by a data server module 12 in the database system 10 of FIG. 2. If more than one data server module 12 is involved in a particular transaction, then each data server module 12 performs the acts of FIG. 3 concurrently.

Upon receiving steps associated with a transaction, the data server module 12 first determines (at 102) if the transaction specifies both a read and write of the join view JV. As used here, writing a view is also referred to as updating or modifying the view. If the transaction specifies both a read and write of JV, then the data server module 12 determines (at 104) if an S lock, X lock, or Y lock is currently active on the join view JV. If none of an S lock, X lock, or Y lock is active on the join view JV, the data server module 12 places (at 106) an X lock on the join view JV. Note that the X lock required for the received transaction conflicts with any of an X lock, S lock, or Y lock, so that the presence of any such table-level lock on JV blocks the required X lock for the received transaction.

If the data server module 12 determines (at 104) that any of the S lock, X lock, or Y lock is active on JV, the data server module 12 performs (at 108) conflicting lock processing. For example, the data server module 12 can wait until the current conflicting lock has been released. Different embodiments perform different tasks in response to detecting that a received transaction cannot proceed because of conflicting locks placed on the join view JV.

If the transaction is determined not to involve both a read and write of the join view JV (at 102), the data server module 12 checks (at 110) if the transaction involves a read (but not a write) of the join view. If so, the data server module 12 checks (at 112) if there is either a Y lock or an X lock on JV. If neither a Y lock nor X lock is currently active on JV, the data server module 12 places (at 114) an S lock on the join view JV. Note that the required S lock conflicts with either a Y lock or X lock, so that the presence of either the Y lock or X lock blocks acquisition of the S lock for the received transaction. If either a Y lock or X lock is presently active on JV, the data server module 12 processes (at 108) the conflicting lock condition.

If the transaction does not involve a read of the join view JV, the data server module checks (at 116) if the transaction involves a write (but not a read) of the join view JV. If so, the data server module 12 checks (at 118) if there is either an S lock or an X lock on JV. If not, then the data server module 12 places (at 120) a Y lock on the join view JV. However, if either an S lock or an X lock is presently active on JV, the data server module 12 processes (at 108) the conflicting lock condition.

The discussion above refers to placing a table-level Y lock on a join view. The Y-lock locking mechanism for join views is extendable to also allow value locks on join views. Consider a join view JV defined on base relations $R_1$, $R_2, \ldots$, and $R_n$. For a fixed i ($1 \leq i \leq n$), suppose that $R_i.a_i$ is an attribute of base relation $R_i$ that also appears in JV. This is the case for the example join view JV of FIG. 1. Then X, Y, and S value locking on $R_i.a_i$ for JV is allowed. For example, consider a transaction T that only updates base relation $R_i$. If the update to base relation $R_i$ specifies the value(s) of $R_i.a_i$, then transaction T can also place an IY lock on JV and one or several Y value locks on $R_i.a_i$ for JV. If transaction T reads JV by specifying the $R_i.a_i$ value(s), then transaction T can put an IS lock on JV and one or several S value locks on $R_i.a_i$ for JV. If transaction T both reads and updates JV by specifying the $R_i.a_i$ value(s), then transaction T can put an IX lock on JV and one or several S value locks, Y value locks, and X value locks on $R_i.a_i$ for JV.

The IY lock is similar to the traditional IX lock except that it is compatible with a Y lock or another IY lock. As with the IX lock, the table-level IY lock is placed on the join view JV in conjunction with an Y value lock of JV to indicate to subsequent transactions that table-level X or S locks on JV are blocked (however, a table-level Y or IY lock on JV is still possible in the presence of the IY lock with Y value lock). Also, a subsequent IS lock with an S value lock on JV is allowed in the presence of an IY lock with Y value lock on JV.

For a transaction that performs both a (table-level) read and (value) write of the join view JV, both an S lock and X value lock are needed on the join view JV. In this case, a table-level SIY lock (which is equivalent to an S lock and an TY lock) is placed on JV. The SIY lock is similar to the traditional SIX lock. One can think that 1x=IS+IY. An SIX lock is equivalent to an S lock and an IX lock (for an X value lock). The SIY lock is only compatible with the IS lock.

Note that SIX=S+IX=S+(IS+IY)=(S+IS)+IY=S+IY=SIY. Thus, the SIX lock is the same as the SIY lock.

If transaction T both updates JV (without specifying the $R_i.a_i$ value(s)), which is a table-write, and reads JV (specifying the $R_i.a_i$ value(s)), which is a value-read, then transaction T requires both a Y lock and S value lock(s) on JV. In this case, a table-level YIS lock is played on JV (which is equivalent to a Y lock and an IS lock). The YIS lock (Y+IS) is similar to the SIX lock and is only compatible with the IY lock.

The compatibilities of the different locks are listed in Table 1.

TABLE 1

|     | Y   | S   | X   | IS  | IY  | IX  | SIY | YIS |
| --- | --- | --- | --- | --- | --- | --- | --- | --- |
| Y   | yes | no  | no  | no  | yes | no  | no  | no  |
| S   | no  | yes | no  | yes | no  | no  | no  | no  |
| X   | no  | no  | no  | no  | no  | no  | no  | no  |
| IS  | no  | yes | no  | yes | yes | yes | yes | no  |
| IY  | yes | no  | no  | yes | yes | yes | no  | yes |
| IX  | no  | no  | no  | yes | yes | yes | no  | no  |
| SIY | no  | no  | no  | yes | no  | no  | no  | no  |
| YIS | no  | no  | no  | no  | yes | no  | no  | no  |

According to Table 1, a Y lock on JV is compatible with another Y lock or an IY lock on JV. However, the Y lock is incompatible with a table-level S lock, X lock, IS lock, IX lock, SIY lock, or YIS lock. Note that a table-level X lock is incompatible with any lock. An IY lock on JV is compatible with a table-level Y lock, IS lock, IY lock, IX lock, or YIS lock. However, an IY lock is incompatible with a table-level S lock, X lock, and SIY lock. An IX lock is compatible with an IS, IY, or IX lock, but not with any other locks. An SIY lock (S+IY lock) is compatible with an IS lock, but not with any other locks. A YIS lock (Y+IS lock) is compatible with an IY lock, but not with any other locks.

Figure 7:
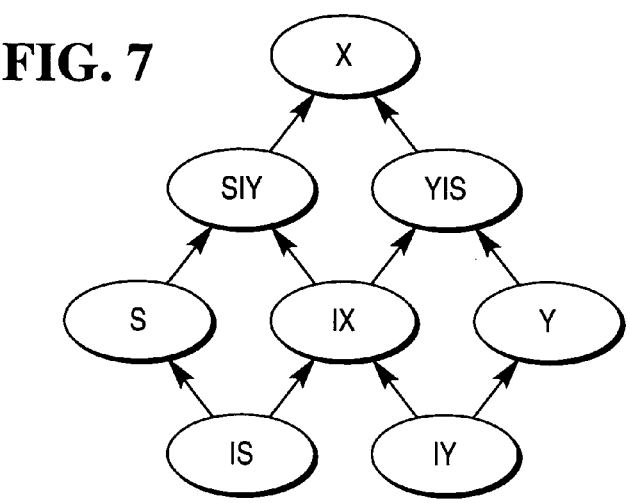
FIG. 7 illustrates a lock conversion lattice.

A lock conversion lattice is shown in FIG. 7. The top of the lattice is a node corresponding to the strongest lock available in the database system—the X lock. The bottom of the lock conversion lattice has nodes corresponding to the two weakest locks—the IS lock and the IY lock. If a lock is held in one mode (corresponding to one of the nodes of the lock conversion lattice) and requested in a second mode, then the locking mode is converted to the maximum of the two modes in the lock conversion lattice. The possible transitions between the locking modes are indicated by the arrows in FIG. 7.

The Y-lock locking mechanism also applies to any single-table materialized view MV defined on base relation R as $MV=\pi(\sigma(R))$ and any single-table aggregate materialized view AMV defined on base relation R as $AMV=\gamma(\pi(\sigma(R)))$. $\sigma$ denotes a selection operator, $\pi$ denotes a projection operator, and $\gamma$ denotes an aggregate operator.

Using the Y-lock locking mechanism, multiple transactions are able to update the same tuple in an aggregate join view AJV simultaneously. This may lead to an undesirable phenomenon. For example, consider the following two transactions T and T'. Each transaction inserts a new tuple into a base relation of AJV and generates a join result tuple. If both join result tuples have the same group by attribute(s) value (group by attribute(s) refer to the attribute(s) in the GROUP BY clause of the aggregate join view definition), then both join result tuples should be aggregated into the same tuple in the aggregate join view AJV. However, if Y locking is employed, it may be possible to insert two new tuples into the aggregate join view AJV as two separate tuples, even though the two new tuples should be combined as one tuple and aggregated in the aggregate join view.

Alternatively, if the aggregate join view AJV originally contains no tuple with a given group by attribute(s) value, then two new two join result tuples that are being inserted may be inserted as two different new tuples in the aggregate join view AJV. For example, this may happen when the aggregate join view AJV is stored in a hash file in which a Y value lock (or a table-level Y lock) instead of an X value lock (or a table-level X lock) is used.

The following describes an example employing the Y value lock to illustrate this phenomenon. Suppose the schema of the aggregate join view AJV is (a, SUM(b)), where attribute a is the value locking attribute. The aggregate join view AJV is stored in a hash file where attribute a is the hash key. Suppose originally the aggregate join view AJV contains tuple (20, 2) and several other tuples. However, there is no tuple whose attribute a=1 in the aggregate join view AJV. Consider the following three transactions T, T', and T". Transaction T inserts a new tuple into a base relation R of AJV and generates the join result tuple (1, 1) that needs to be integrated into AJV. Transaction T' inserts another new tuple into the same base relation R of AJV and generates the join result tuple (1, 2) that needs to be integrated into AJV. Transaction T" deletes a third tuple from base relation R of AJV so that tuple (20, 2) needs to be deleted from AJV.

Figure 8:
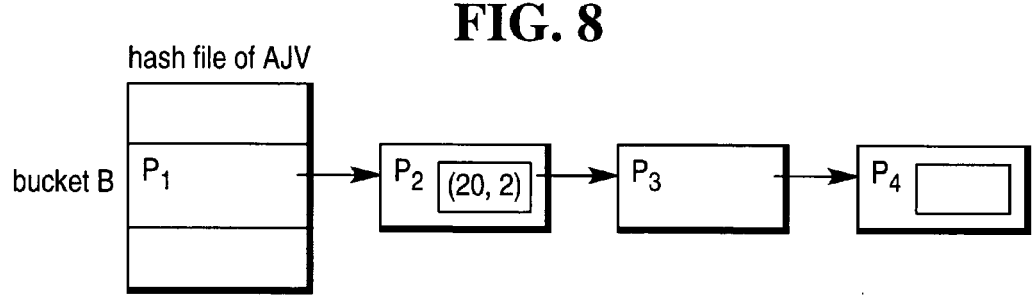
FIGS. 8–11 illustrate pages of a hash file.

After executing these three transactions, tuple (20, 2) should be deleted from AJV while tuple (1, 3) should be inserted into AJV. Suppose 20 and 1 have the same hash value so that tuple (20, 2) and tuple (1, 3) are stored in the same bucket B of the hash file. Suppose there are four pages in bucket B: one bucket page $P_1$ and three overflow pages $P_2$, $P_3$, and $P_4$. All these pages are linked together as illustrated in FIG. 8. Pages $P_1$, $P_2$, and $P_3$ are full and there is no open slot there. There are several open slots in page $P_4$.

Using Y value locks, transactions T, T', and T" may be executed in the following manner. Transaction T gets a Y value lock for attribute a=1 on AJV. Transaction T applies the hash function to attribute a=1 to find the corresponding hash table bucket B. Transaction T crabs all the pages in bucket B to see whether a tuple $t_2$ whose attribute a=1 already exists in the hash file or not. After crabbing, transaction T finds that no such tuple $t_2$ exists. "Crabbing" refers to a procedure in which a transaction does not release a semaphore on one page until the transaction obtains a semaphore on the next page.

Transaction T' gets a Y value lock for attribute a=1 on AJV. Transaction T' applies the hash function to attribute a=1 to find the corresponding hash table bucket B. Transaction T' crabs all the pages in bucket B to see whether a tuple $t_2$ whose attribute a=1 already exists in the hash file or not. After crabbing, transaction T' finds that no such tuple $t_2$ exists.

Figure 9:
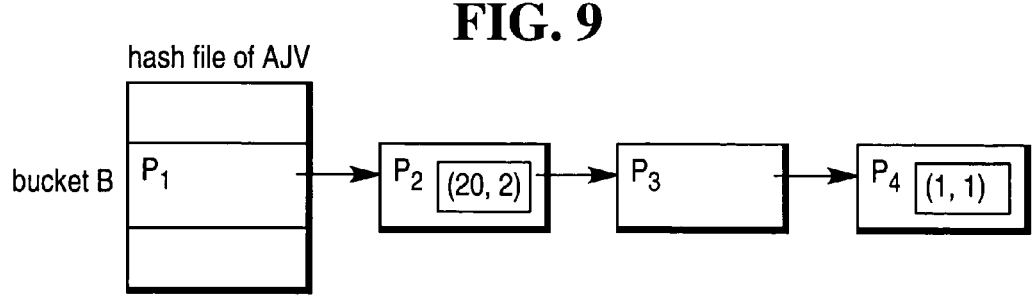

Transaction T crabs the pages in bucket B again. Transaction T finds that only page $P_4$ has enough free space. Transaction T inserts a new tuple (1, 1) into page $P_4$ (as shown in FIG. 9) for the join result tuple (1, 1). Transaction T commits and releases the Y value lock for attribute a=1 on AJV.

Figure 10:
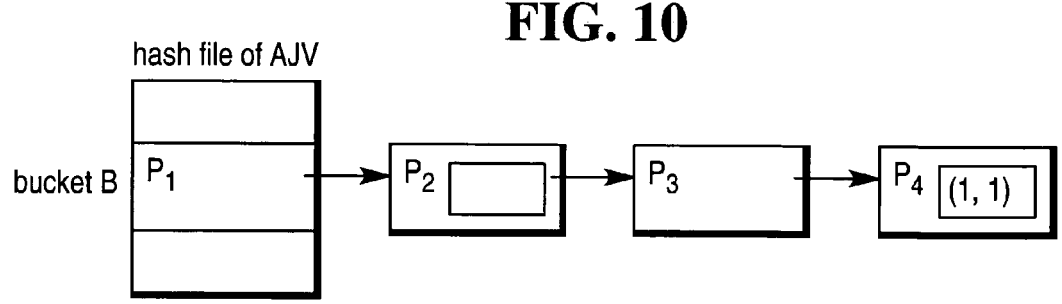

Transaction T" gets a Y value lock for attribute a=20 on AJV. Transaction T" finds that tuple (20, 2) is contained in page $P_2$. Transaction T" deletes tuple (20, 2) from page $P_2$ so that there is an open slot in page $P_2$ (see FIG. 10). Transaction T" commits and releases the Y value lock for attribute a=20 on AJV.

Figure 11:
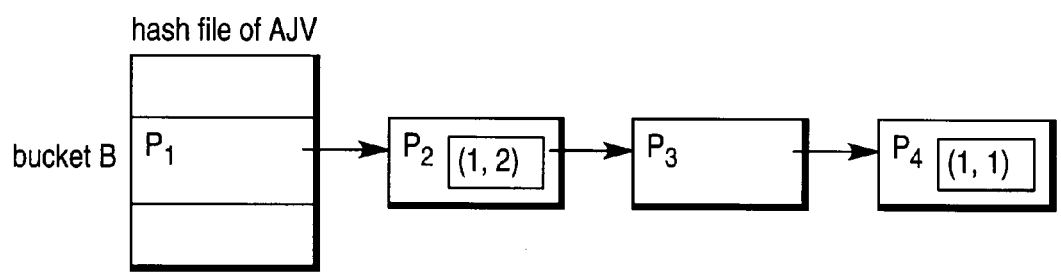

Transaction T' crabs the pages in bucket B again. Transaction T' finds that page $P_2$ has an open slot. Transaction T' inserts a new tuple (1, 2) into page $P_2$ (as shown in FIG. 11) for the join result tuple (1, 2). Transaction T' commits and releases the Y value lock for attribute a=1 on AJV.

As shown in FIG. 11, the aggregate join view AJV contains two tuples (1, 1) and (1, 2) instead of a single tuple (1, 3), which is not correct. To prevent this undesirable situation from occurring, a short-term W value lock mode is employed for aggregate join views. The W value lock mode guarantees that for each aggregate group, at any time at most one tuple corresponding to this group exists in the aggregate join view AJV. The W value lock mode is only compatible with the Y value lock mode. The compatibilities of the different value locks are listed in Table 2.

TABLE 2

|   | Y   | S   | X  | W   |
|---|-----|-----|----|-----|
| Y | yes | no  | no | yes |
| S | no  | yes | no | no  |
| X | no  | no  | no | no  |
| W | yes | no  | no | no  |

As indicated by Table 2, the Y value lock is compatible with another Y value lock, which enables multiple tuples with the same Y value lock to be updated in an aggregate join view AJV. A W value lock is compatible with a Y value lock; however, a W value lock is not compatible with itself. In other words, if a W value lock is placed on a given value locking attribute value for a first update, then a second update seeking another W value lock on the same value locking attribute value will be blocked.

Figure 12:
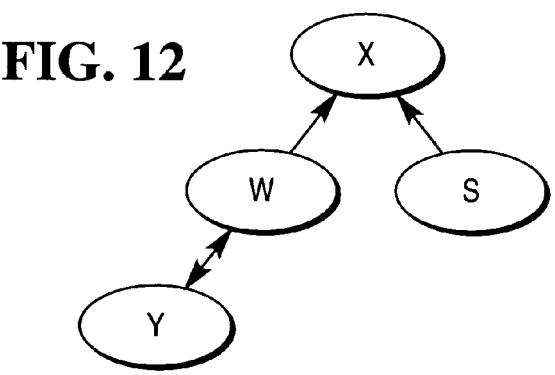
FIG. 12 illustrates another lock conversion lattice that illustrates transitions between different locks, including a W value lock according to some embodiments.

The value lock conversion lattice is shown in FIG. 12. The database system is able to convert the W value lock into either an X value lock or a Y value lock. In other words, it is capable of converting the W value lock into either a stronger lock (X lock) or a weaker lock (Y lock).

Figure 13:
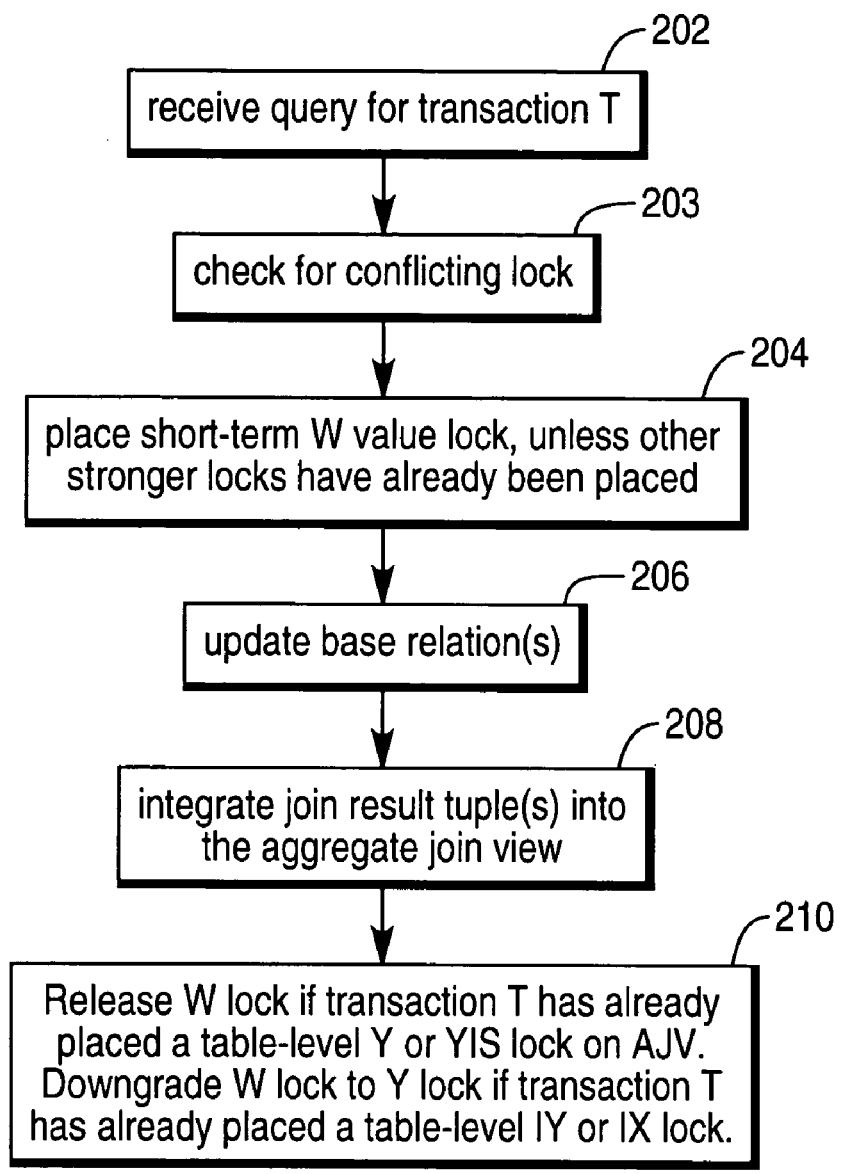
FIG. 13 is a flow diagram of a process that utilizes a W value lock when updating an aggregate view.

In the following discussion, it is assumed that the aggregate join view AJV has a value locking attribute $a_i$. As shown in FIG. 13, a flow of tasks performed by the database system 10 in accordance with an embodiment is illustrated. The tasks are performed by the database software (e.g., one or more of the parsing engine 16 and data server modules 12 shown in FIG. 2). In response to receiving (at 202) a database query, the database system 10 performs tasks of the requested transaction T. For purposes of this example, it is assumed that the transaction T updates one or more base relations, and an aggregate join view is defined on the one or more base relations. Updates of the one or more base relations cause corresponding updates of the aggregate join view to occur. For example, if transaction T inserts a new tuple into a base relation, then a new join result tuple, referred to as join result tuple $t_1$, is also generated for integration into the aggregate join view AJV. "Integrating" a tuple into an aggregate join view AJV refers to inserting a join result tuple into the AJV or combining the join result tuple with another existing tuple in the aggregate join view AJV that belongs to the same group as the join result tuple.

Transaction T next checks (at 203) for conflicting locks (locks that conflict with a W value lock) that have been placed on the aggregate join view AJV. A lock that conflicts with a W value lock placed on the value $t_1.a_i$ includes an exclusive lock (table-level X lock or an X value lock on the same value $t_1.a_i$), a shared lock (table-level S lock or an S value lock on the same value $t_1.a_i$), or another W value lock placed on the same value $t_1.a_i$.

If no conflicting lock has been placed on AJV, transaction T places (at 204) a short-term W value lock (assuming another stronger lock has not already been placed) for $t_1.a_i$ on AJV before it can integrate the join result tuple $t_1$ into the aggregate join view AJV. If transaction T has already placed an X value lock for $t_1.a_i$, a table-level X lock, or a table-level SIY lock on AJV, this W value lock is not necessary. If transaction T has already put a Y value lock for $t_1.a_i$ on AJV, this Y value lock is upgraded to the W value lock (unless transaction T has already put a table-level SIY lock on AJV).

Transaction T then performs the update (at 206) of the base relation(s), and integrates (at 208) the join result tuple (or multiple join result tuples) into the aggregate join view AJV. After transaction T integrates the join result tuple $t_1$ into AJV, the database system 10 performs (at 210) one of two tasks: (1) the short-term W value lock is released if transaction T has already placed a table-level Y (or YIS) lock on AJV, or (2) the short-term W value lock is downgraded to a long-term Y value lock (that will be held until the end of the transaction) if transaction T has already placed a table-level IY (or IX) lock on AJV.

Using the W value lock mode, the undesirable situation described above (multiple join result tuples belonging to the same group are integrated as different tuples in the aggregate join view AJV) will not occur. Such an undesirable situation may occur under the following conditions: (1) two transactions want to integrate two new join result tuples into the aggregate join view AJV simultaneously, (2) these two join result tuples belong to the same aggregate group, and (3) no tuple corresponding to that aggregate group currently exists in the aggregate join view AJV. Using the short-term W value lock, one transaction, such as T, performs the update to the aggregate join view AJV first (by inserting a new tuple $t_2$ with the corresponding group by attribute value into AJV). During the period that transaction T holds the short-term W value lock, no other transaction can integrate another join result tuple that has the same group by attribute value as tuple $t_2$ into the aggregate join view AJV. Then when another transaction T' does the update to the aggregate join view AJV, the second transaction T' will see the existing tuple $t_2$ in AJV. Thus, transaction T' will aggregate its join result tuple that has the same group by attribute value as tuple $t_2$ into tuple $t_2$ (rather than insert a new tuple into AJV).

Note the W value lock mode is also applicable to enhance the Y-lock locking mechanism to be used for single-table aggregate materialized views AMV.

The following provides an example of a situation where both a Y value lock and a W value lock can be placed concurrently on an aggregate join view. Suppose the aggregate join view AJV has the schema (a, SUM(b)), where a is the value locking attribute. Suppose the definition of AJV is CREATE AGGREGATE JOIN VIEW AJV
AS SELECT A.a, SUM(B.b)
FROM A, B
WHERE A.c=B.d
GROUP BY A.a;

Also assume that base table A is of the schema (a, c), and base table B is of the schema (b, d). Suppose there are two tuples in base table B whose values are (2, 3) and (7, 4), and there is one tuple in base table A whose value is (1, 3). Also assume tuple-level locking is used on base table A. In this example, the AJV contains only one tuple (1, 2). A transaction T1 is received that wants to delete the tuple (1, 3) from table A. Transaction T1 will place a Y value lock on AJV for a=1 in order to delete (1, 2) from AJV. Another transaction T2 is also received that wants to insert another tuple (1, 4) into table A. Transaction T2 will place a W value lock on AJV for a=1 to insert the join result tuple (1, 7) into AJV. Transactions T1 and T2 do not conflict, since the Y value lock and the W value lock do not conflict with each other.

IV. Isolation Property of Y Locks

To show that the Y-lock locking mechanism keeps the isolation property (serializability) of transactions, the following assertions are proven for a join view JV defined on base relations $R_1, R_2, \ldots,$ and $R_n$:

Assertion 1: Transaction T's writes to join view JV are neither read (first part of Assertion 1) nor written (second part of Assertion 1) by other transactions until transaction T completes (aborts or commits).

Assertion 2: Transaction T does not overwrite dirty data of other transactions (data that is being modified by other transactions) in join view JV.

Assertion 3: Transaction T does not read dirty data of other transactions in join view JV.

Assertion 4: Other transactions do not write any data in join view JV that is read by transaction T before transaction T completes.

The four assertions are first proven for the simple case where $JV=\sigma(R_1 \bowtie \ldots \bowtie R_i \bowtie \ldots \bowtie R_n)$, where $\sigma$ denotes a selection operator. The assertions are also proven (further below) for the general case where $JV=\pi(\sigma(R_1 \bowtie \ldots \bowtie R_i \bowtie \ldots \bowtie R_n))$, where $\pi$ is a projection operator. Selection refers to selecting rows of base relations to place into JV based on the rows satisfying the join condition. Projection refers to projecting only those attributes that are in the select list of the join query into the join view JV. Less than all attributes of each base relation can be projected into the join view JV.

It is assumed that join view JV allows duplicate tuples. If no duplicate tuples are allowed in JV, assume that each tuple in JV has a dupent (or some other named parameter) attribute recording the number of copies of that tuple. The following assumptions are made (the other more complex cases can be proven in a similar way): (1) any transaction T updates at most one base relation of JV; and (2) if transaction T tries to update base relation $R_i (1 \leq i \leq n)$, it places a Y lock on JV and an S lock on each $R_j (1 \leq j \leq n, j \cdot i)$. For example, if a join view JV is defined on base relations A, B, and C, an update of A causes an X lock or IX lock to be placed on A, and a Y lock to be placed on JV. In addition, an S lock is placed on each of the other base relations B and C.

If transaction T writes join view JV, T places a table-level Y lock on JV until T completes. If transaction T both reads and writes join view JV, T places a table-level X lock on JV until T completes. Thus transaction T's writes to join view JV are not read by any other transaction T' until transaction T completes, since T' requires a table-level S lock on JV (which would conflict with the Y lock or X lock on JV for transaction T). This proves the first part of Assertion 1

Additionally, if transaction T writes join view JV, there are two possible cases:

Case 1: Transaction T both reads and updates join view JV. In this case, transaction T puts a table-level X lock on JV until it completes. This X lock will block other transactions from writing JV (by blocking other Y or X lock requests).

Case 2: Transaction T updates the base relation $R_i$ $(1 \leq i \leq n)$. Transaction T puts an S lock on each $R_j$ $(1 \leq j \leq n, j \neq i)$ until T completes. If another transaction T' tries to write join view JV before transaction T completes, transaction T' can only update the same base relation $R_i$. This is because if transaction T' updates another base relation $R_j$ $(1 \leq j \leq n, j \neq i)$ of join view JV, the requirement of an IX or X lock on $R_j$ for transaction T' will be blocked by the existing S lock on $R_j$ that is placed by transaction T.

Suppose that transactions T and T' update $\Delta R_i$ and $\Delta R_i'$ of base relation $R_i$, respectively. $\Delta R_i$ refers to the changed portion of $R_i$ made by transaction T, and $\Delta R_i'$ refers to the changed portion of $R_i$ made by transaction T'. There are three possible scenarios:

Scenario 1: If transaction T puts a table-level X lock on base relation $R_i$, transaction T' will get blocked when it tries to get either a table-level X lock or a table-level IX lock on $R_i$.

Scenario 2: If transaction T puts a table-level IX lock on base relation $R_i$, transaction T' will get blocked if it tries to get a table-level X lock on $R_i$.

Scenario 3: Suppose that transaction T puts a table-level IX lock and one or several X value locks on base relation $R_i$. Also, transaction T' tries to put a table-level IX lock and one or several X value locks on base relation $R_i$. There are two cases:

(a) $\Delta R_i \cap \Delta R_i' \neq \emptyset$ ($\Delta R_i$ intersects with, or overlaps, $\Delta R_i'$). The requirement of X value locks on $R_i$ for transaction T' will be blocked by the existing X value locks on $R_i$ that is put by transaction T, since T and T' are changing the same portion of $R_i$ (the portion that overlaps).

(b) $\Delta R_i \cap \Delta R_i' = \emptyset$ ($\Delta R_i$ does not intersect with $\Delta R_i'$). Then $\sigma$ ($R_1 \bowtie \ldots \bowtie \Delta R_i \bowtie \ldots \bowtie R_n) \cap \sigma$ ($R_1 \bowtie \ldots \bowtie \Delta R_i' \bowtie \ldots \bowtie R_n) = \emptyset$. In other words, the intersection of the updates to JV by transactions T and T' is empty.

Thus transaction T's writes to join view JV are not written by any other transaction T' until transaction T completes (this proves the second part of Assertion 1).

Based on a similar reasoning to the proof of Assertion 1, transaction T does not overwrite dirty data of other transactions in join view JV (this proves Assertion 2).

Suppose that transaction T reads join view JV by requiring a table-level S lock on JV. If some other transaction T' is writing any data in join view JV, T' will place a table-level Y lock (or X lock) on JV until T' completes. The required table-level S lock on JV for transaction T will be blocked by the table-level Y or X lock on JV for transaction T'. Thus transaction T does not read dirty data from transaction T' in join view JV (this proves Assertion 3). The case that transaction T tries to both read and update the join view JV can be proved similarly, since the required X lock will be blocked by the Y or X lock for transaction T'.

If transaction T reads join view JV, T will place a table-level S lock on JV until T completes. If transaction T both reads and writes join view JV, T will place a table-level X lock on JV until T completes. Thus no other transaction T' can write any data in JV until transaction T completes, since T' requires a table-level Y lock (or X lock) on JV. This proves Assertion 4.

Figure 4A:
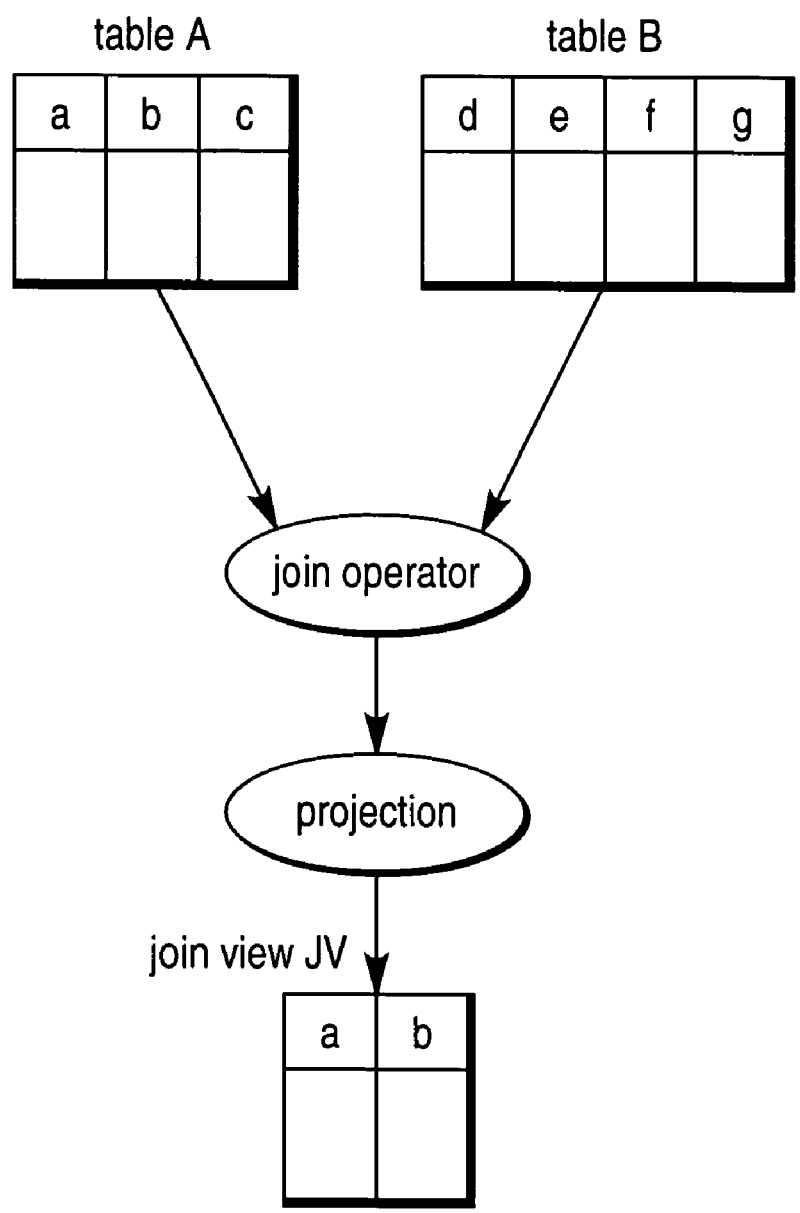

The proof for the general case where $JV = \pi(\sigma(R_1 \bowtie \ldots \bowtie R_i \bowtie \ldots \bowtie R_n))$ is discussed here. When projection is applied, less than all the attributes of the base relations $R_i$ ($1 \leq i \leq n$) will be in a join view JV based on the base relations $R_1, R_2, \ldots, R_n$. This is illustrated in FIG. 4A. In the example, the join view JV contains only attributes A.a and A.b. The other attribute A.c of relation A and attributes B.d, B.e, B.f, B.g of relation B are not in JV. In this general case, the proofs of the four assertions are the same except for the case where $\Delta R_i \cap \Delta R_i' = \emptyset$ in Assertion 1. In this case, a virtual join view $JV' = \sigma(R_1 \bowtie \ldots \bowtie R_i \bowtie \ldots \bowtie R_n)$ is defined conceptually (that is, JV' is an imaginary table that does not exist in the database system). The virtual join view is a join view without the projection applied. Therefore, JV' contains all attributes of the base relations. Each tuple in the actual join view JV comes from (and is a subset of) one tuple in JV'. Conceptually, if the tuples in JV are expanded to include all the attributes of JV', then the tuples in JV are different from each other. After computing the change $\Delta = \sigma(R_1 \bowtie \ldots \bowtie \Delta R \bowtie \ldots \bowtie R_n)$, for each tuple $TA_1$ in $\Delta$, there are three possible cases:

Case 1: Tuple $TA_1$ is inserted into $\Delta$. This means that $\pi(TA_1)$ needs to be inserted into JV. We insert $\pi(TA_1)$ into JV. Conceptually, the expanded tuple of $\pi(TA_1)$ is $TA_1$.

Case 2: Tuple $TA_1$ is updated into $TA_2$ in $\Delta$. This means that tuple $\pi(TA_1)$ needs to be updated into $\pi(TA_2)$ in JV. A tuple $TA_3$ in JV that is equal to $\pi(TA_1)$ can be identified. Note that there may be several tuples in JV that are equal to $\pi(TA_1)$. However, conceptually, it can be thought that the expanded tuple of the identified tuple $TA_3$ is equal to $TA_1$. Then tuple $TA_3$ in JV is updated from $\pi(TA_1)$ to $\pi(TA_2)$. Conceptually, it can be thought that the expanded tuple of the updated $TA_3$ is $TA_2$.

Case 3: Tuple $TA_1$ is deleted from $\Delta$. This is similar to case 2.

For example, suppose each tuple without projection originally has three attributes (a, b, c). After projection, the tuple only contains two attributes (a, b). Suppose there are tuples T1=(1, 2, 3), T2=(1, 2, 4), and T3=(1, 5, 6). After projection, the tuples become T1'=(1, 2), T2'=(1, 2), T3'=(1, 5). Thus, the expanded tuple of T1' is T1, the expanded tuple of T2' is T2, and the expanded tuple of T3' is T3. Suppose the tuple T2=(1, 2, 4) is updated to (1, 8, 5). Then, after projection, one of the tuples (1, 2) is changed to (1, 8). However, T1' and T2' look the same. Suppose T1' is changed from (1, 2) to (1, 8). Note T2' originally comes from T2, so T2' should be changed instead of T1'. However, a distinction between T1' and T2' in JV cannot be made as they look the same. The tuples before the projection become T1=(1, 2, 3), T2=(1, 8, 5), and T3=(1, 5, 6). The tuples after projection become T1'=(1, 8), T2'=(1, 2), T3'=(1, 5).

However, conceptually, it can be thought that the expanded tuple of T1' is T2, the expanded tuple of T2' is T1, and the expanded tuple of T3' is T3. That is, conceptually it can be thought that the expanded tuple of the identified tuple, T1', is equal to tuple T2, even if T1' originally comes from tuple T1. Note tuples in the relation have no order. If the order of tuples in the relation is switched, the same relation can be obtained. Thus, if the order of T1' and T2' is switched, the tuples after projection become T1'=(1, 2), T2'=(1, 8), T3'=(1, 5). Then it can be thought that the expanded tuple of T1' is T1, the expanded tuple of T2' is T2, and the expanded tuple of T3' is T3. The key point is that tuples in the JV with the same value have no difference and thus can be treated in any way.

Thus, conceptually, $$\pi(\sigma(R_1 \bowtie \ldots \bowtie \Delta R_i \bowtie \ldots \bowtie R_n)) \cap \pi(\sigma(R_1 \bowtie \ldots \bowtie \Delta R_i' \bowtie \ldots \bowtie R_n)) = \emptyset.$$

That is, the intersection of the updates to JV by transactions T and T' is empty. Consequently, transaction T's writes to join view JV are not written by any other transaction T' until transaction T completes (this proves part 2 of Assertion 1 for the general case).

Figure 4B:
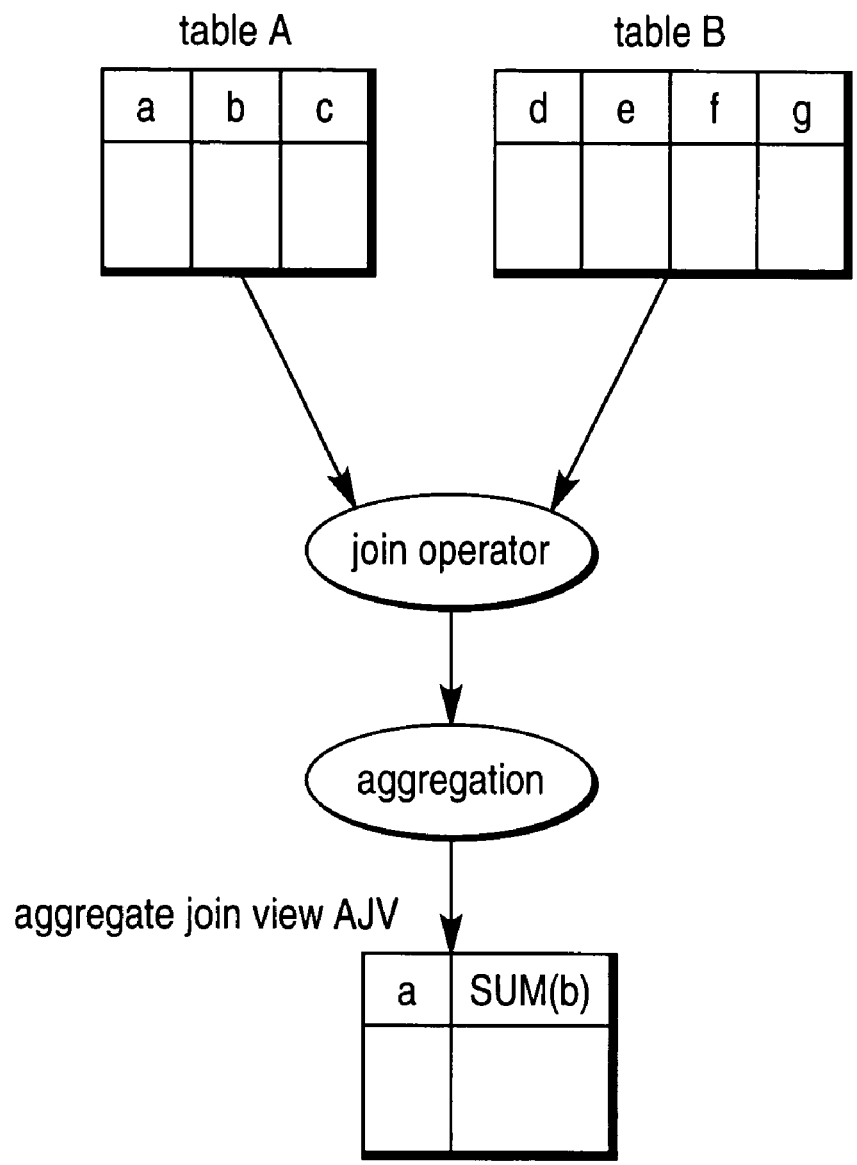

The Y-lock locking mechanism for join views also applies to aggregate join views. An example aggregate join view AJV is created as follows:

CREATE AGGREGATE JOIN VIEW AJV AS
SELECT A.a, SUM (A.b)
FROM A, B
WHERE A.c=B.d
GROUP BY A.a;

As shown in FIG. 4B, the aggregate join view AJV contains an attribute A.a and a sum of the attribute A.b. SUM is one type of aggregate function, with other aggregate functions including COUNT, AVG, and so forth.

Consider an aggregate join view AJV=$\gamma(\pi(\sigma(R_1 \bowtie \ldots \bowtie R_i \bowtie \ldots \bowtie R_n)))$, where $\gamma$ is the aggregation operator. A virtual (imaginary) join view JV=$\pi(\sigma(R_1 \bowtie \ldots \bowtie R_i \bowtie \ldots \bowtie R_n))$ is defined so that AJV=$\gamma$ (JV). In other words, the aggregate join view AJV is equal to the virtual join view after aggregation.

An example of this is illustrated in FIG. 4C. Assume that the schema of AJV is (A.a, SUM(B.d))—in other words, AJV has two attributes: A.a and the sum of B.d. Assume that initially AJV has one tuple (1, 3). Subsequently, as a result of a new transaction(s), join result tuples (1, 1) and (1, 5), which are results due to a join of base relations A and B, are to be inserted into AJV. The join result tuples are not inserted into new rows of AJV, but rather, the existing row in AJV is updated by summing B.d values of the join result tuples to the existing tuple of AJV. Thus, AJV is updated by updating SUM(B.d), which is 3+1+5=9. Thus, after the update, AJV has the tuple (1, 9).

For purposes of proving the assertions above, the virtual or imaginary JV remains consistent with AJV. The schema of the virtual join view JV is (a, d). Aggregation is not performed on the virtual join view JV so that the join result tuples are added into new rows of the virtual join view JV. However, note that aggregation of the virtual join view JV will cause it to result in AJV.

Thus, whenever AJV is updated by $\Delta$, conceptually, the corresponding tuples that produce $\Delta$ are updated in the virtual join view JV. By the above reasoning, if the virtual join view JV is considered instead of the aggregate join view AJV, then any parallel execution of the transactions are equivalent to some serial execution of these transactions. AJV is always set equal to $\gamma$(JV). Thus if the virtual join view JV is replaced by AJV, any parallel execution of the transactions are still equivalent to some serial execution of the transactions. This proves the four assertions above.

The main reason the above proof works is due to the fact that the addition operation for the SUM, COUNT, and AVG aggregate operators is both commutative and associative. For any tuple t in the aggregate join view AJV, all the tuples A producing it are kept in the virtual join view JV. Since the addition operator is both commutative and associative, tuple t can be produced from those tuples A in any order. In addition, the use of the W value lock mode guarantees that for each aggregate group, at any time at most one tuple corresponding to this group exists in the aggregate join view AJV. Thus, in the proof, focus is made on those tuples in the virtual join view JV instead of those tuples in the aggregate join view AJV. Also, the Y-lock locking mechanism avoids the problem of inserting multiple tuples of the same group into the aggregate join view by (1) using the W value lock mode, and (2) the Y locking mechanism utilizing the semantics of aggregate join views (all the tuples in the aggregate join views are produced from the tuples in the base relations).

An example is used to illustrate this proof. Suppose the schema of base relation A is (a, c), the schema of base relation B is (d, e), and the aggregate join view AJV is defined as follows:

CREATE AGGREGATE JOIN VIEW AJV AS
SELECT A.a, SUM(B.e)
FROM A, B
WHERE A.c=B.d
GROUP BY A.a;

Suppose base relation A, base relation B, aggregate join view AJV, and the virtual join view JV' originally look as shown in FIG. 14. Then tuple $t_{JV1}$ in the aggregate join view AJV is produced from tuple $t'_{JV1}$ in the virtual join view JV', with AJV=$\gamma(\pi(JV'))$.

Consider the following two transactions. Transaction T inserts tuple $t_{A2}$=(1, 5) into base relation A. To maintain the aggregate join view AJV, the join result tuple $t'_{JV2}$=(1, 5, 5, 2) is computed. Then tuple $t_{JV1}$ in the aggregate join view AJV is updated from (1, 1) to (1, 3), as shown in FIG. 15. It can be imagined that tuple $t'_{JV2}$ is inserted into the virtual join view JV'. Then tuple $t_{JV1}$ in the aggregate join view AJV is produced from tuples $t'_{JV1}$ and $t'_{JV2}$ in the virtual join view JV', with AJV=$\gamma(\pi(JV'))$.

Now a second transaction T' inserts tuple $t_{A3}$=(1, 6) into base relation A, as shown in FIG. 16. To maintain the aggregate join view AJV, the join result tuple $t'_{JV3}$=(1, 6, 6, 4) is computed. Then tuple $t_{JV1}$ in the aggregate join view AJV is updated from (1, 3) to (1, 7). It can be imagined that tuple $t'_{JV3}$ is inserted into the virtual join view JV'. Then tuple $t_{JV1}$ in the aggregate join view AJV is produced from tuples $t'_{JV1}$, $t'_{JV2}$, and $t'_{JV3}$ in the virtual join view JV', with AJV=$\gamma(\pi(JV'))$.

Note transactions T and T' update the same tuple $t_{JV1}$ in the aggregate join view AJV. At this point, if transaction T is aborted, tuple $t_{JV1}$ in the aggregate join view AJV cannot be changed back to the value (1, 1), as the current value of tuple $t_{JV1}$ is (1, 7) rather than (1, 3). However, the calculation 7−2=5 can be performed to change the value of tuple $t_{JV1}$ from (1, 7) to (1, 5). That is, the Y-lock locking mechanism uses logical undo (instead of physical undo) on the aggregate join view if the transaction holding the Y lock aborts.

Figure 5A:
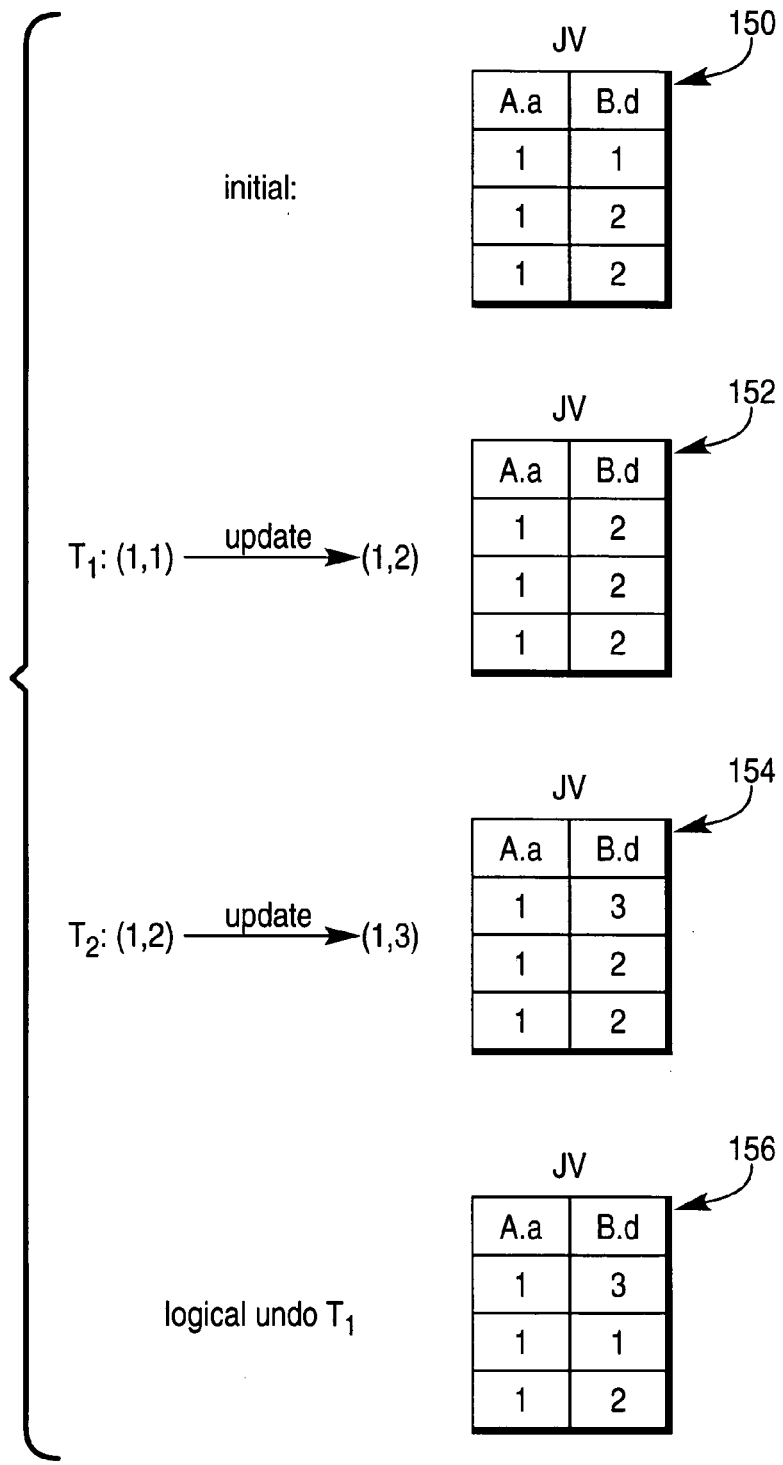
FIGS. 5A–5B illustrate examples of a logical undo mechanism.

Thus, in the context of projection join views and aggregate join views, a physical undo of an update of a join view due to a first transaction ($T_1$) that aborts may not be possible. An example for projection join view is illustrated in FIG. 5A. Assume that projection JV initially contains three tuples (1, 1), (1, 2), and (1, 2), shown as 150 in FIG. 5A. In this example, the projection JV allows duplicate tuples. The scheme of JV is (A.a, B.d). Due to projection, less than all of the attributes of base relations A and B are in the projection JV.

The first transaction $T_1$ updates the tuple (1, 1) in JV to (1, 2). The modified projection JV is shown as 152, where (1, 1) has been changed to (1, 2). In the example, another transaction $T_2$ is also active. $T_2$ updates tuple (1, 2) in JV to (1, 3). The modified projection JV is shown as 154.

After the $T_2$ update, the first transaction $T_1$ aborts. In that case, the tuple (1, 2) that was changed from (1, 1) needs to be un-updated back to (1, 1). However, that tuple has already been changed to (1, 3) by transaction $T_2$, so a physical undo of that tuple is not feasible.

In accordance with some embodiments, a logical undo is performed. In the logical undo, the database system looks for another tuple in the join view JV that has the attribute values (1, 2). That other tuple is changed to the value (1, 1) for a logical undo of transaction $T_1$, shown as 156 in FIG. 5A.

Figure 5B:
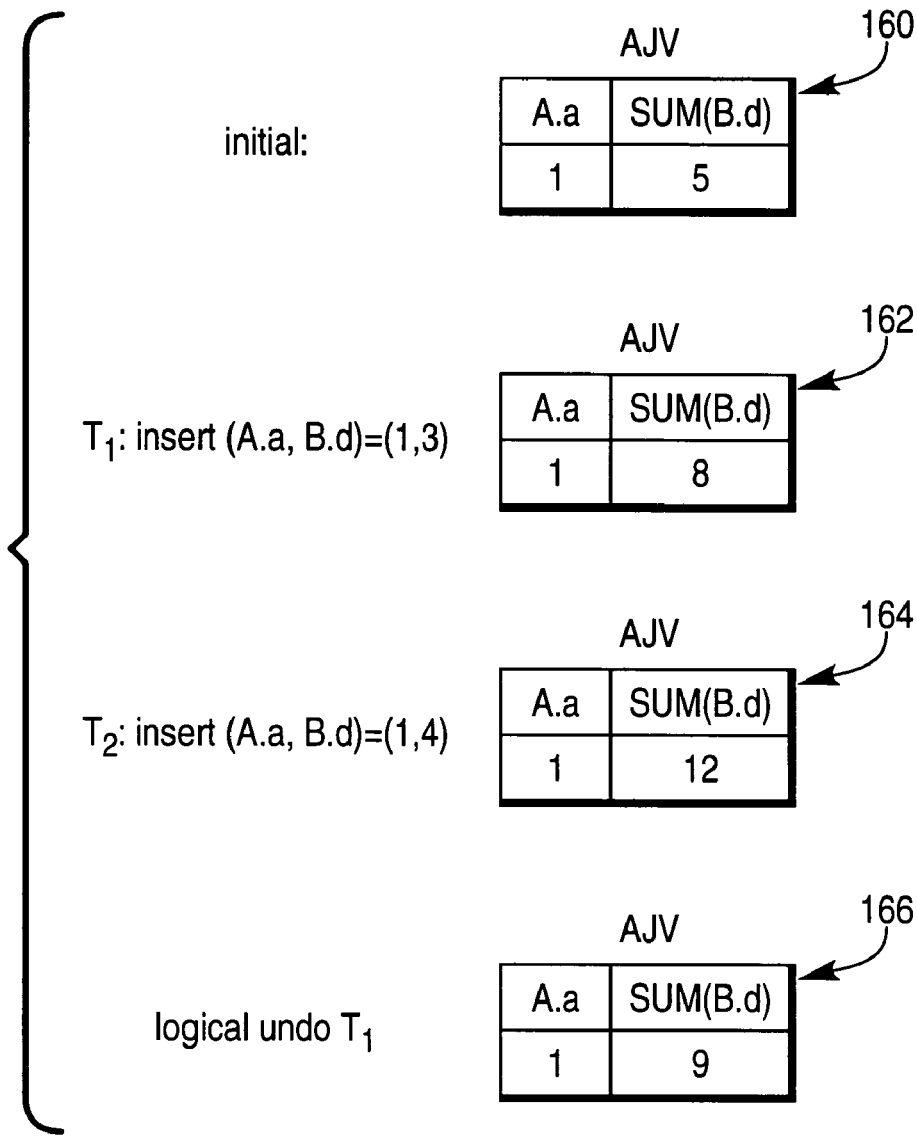

A logical undo is also used for aggregate join views. As shown in FIG. 5B, assume AJV has the scheme (A.a, SUM(B.d)) and initially has the tuple (1, 5), shown as 160. Transaction $T_1$ causes a join result tuple (1, 3), with scheme (A.a, B.d), to be inserted into AJV. This causes the AJV entry to be updated to (1, 8), shown as 162. Before $T_1$ completes, $T_2$ causes a join result tuple (1, 4) to be inserted into AJV, which causes the tuple in AJV to be updated to (1, 12), shown as 164.

If $T_1$ aborts, a physical undo is not possible, since the entry (1, 8) no longer exists in AJV. Therefore, a logical undo is performed to change the tuple (1, 12) in AJV to (1, 9), shown as 166. This removes the contribution of the (1, 3) tuple for transaction $T_1$ from the AJV.

By reducing the occurrences in which transactions block each other due to locks placed on a materialized view, such as a join view, database system performance is enhanced. This is especially beneficial in a parallel database system having plural data server modules, such as that shown in FIG. 2, where the ability to perform steps of multiple transactions on separate data server modules increases database throughout. For example, a portion of one transaction that updates the join view can be performed in a first data server module concurrently with a portion of another transaction that updates the join view on a second data server module.

V. No-Lock Locking Mechanism

In accordance with another embodiment, instead of a Y-lock locking mechanism, a "no-lock" locking mechanism is employed for the join view JV. One purpose of placing a Y lock on a join view JV during an update of the join view in a first transaction is to prevent other transactions from reading JV, as write conflicts on the join view JV have already been handled by placing proper locks on the base relations of JV. However, in another embodiment, according to the "no-lock" locking mechanism, a Y lock (or any other type of lock) on the join view JV can be omitted while still protecting the join view JV as well as maintaining transaction serializability. A benefit of not placing any lock on the join view reduces the overhead associated with maintaining join views in response to update of base relations. Many transactions in the database system 10 are small updates that involve single-tuple or few-tuple updates to base relations of a join view. If locks (such as Y locks) are required for all such small updates, then the required locks may cause a bottleneck, since the lock manager may become tied up with many lock requests.

Figure 6:
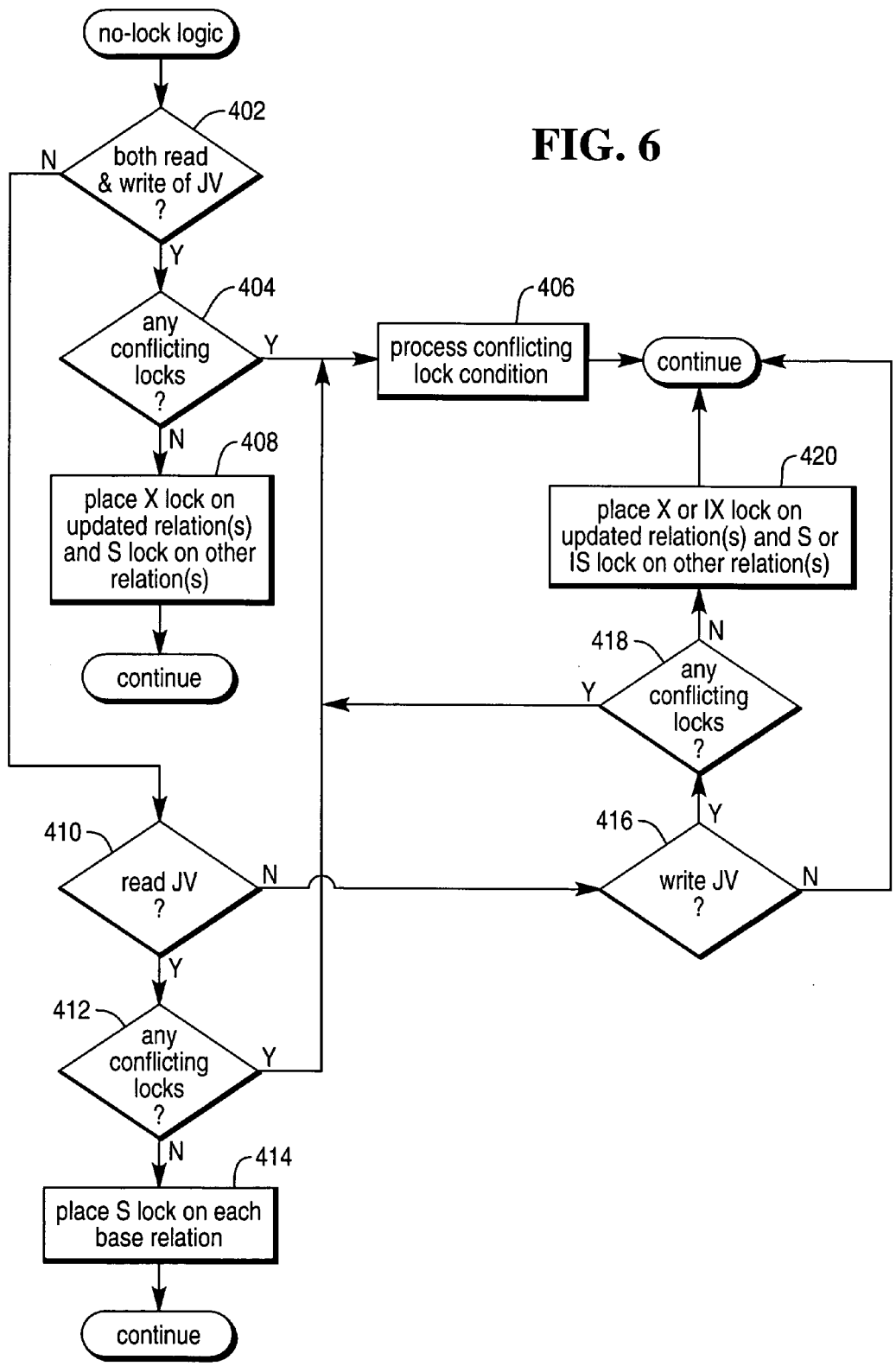
FIG. 6 is a flow diagram of logic for a Y-lock locking mechanism according to another embodiment for join view maintenance.

In some embodiments, a join view cannot be directly updated or modified. In other words, a join view JV is updated or modified by updating the base relations of the join view JV. FIG. 6 illustrates the logic according to one embodiment of the no-lock locking mechanism.

In the discussion below, it is assumed that a join view JV is defined on base relations $R_1, R_2, \ldots,$ and $R_n$. As shown in FIG. 6, a data server module 12 determines (at 402) if a transaction requires both a read and write of the join view JV. A write of JV occurs through write(s) of one or more base relation(s) $R_{t1}, R_{t2}, \ldots, R_{th}(\{t_1, t_2, \ldots, t_h\} \subseteq (1, 2, \ldots, n\})$ on which JV is defined. If the data servet module 12 determines (at 402) that the transaction involves both a read and write of JV, the data server module 12 next checks (at 404) if any conflicting locks are placed on the base relations $R_1, R_2, \ldots,$ and $R_n$. If so, then the data server module 12 performs (at 406) conflicting lock processing, which in one example involves waiting for the conflicting lock(s) to be released.

If no conflicting locks on the base relations are detected, then the data server module 12 places a table-level X lock (at 408) on each base relation $R_{tu}(1 \leq u \leq h)$ that is being updated. Note that the required table-level X lock on each relation $R_{ta}$ would conflict with an X lock, S lock, IX lock, or IS lock. The data server module 12 also places a table-level S lock on each other base relation $R_j(j \in \{1, 2, \ldots, n\} - \{t_1, t_2, \ldots, t_h\})$. Note that the table-level S lock on each $R_j$ required for the received transaction would conflict with an X lock or IX lock that has been placed on $R_j$. Thus, assuming no conflicting locks are present, an X lock is placed on each base relation that is updated, while an S lock is placed on the base relation(s) not being updated.

The table-level X lock on each base relation that is being updated can be replaced with a less restrictive SIX lock (S+IX) if the following condition is satisfied: the update of $R_{t}$ ($1 \leq u \leq h$) specifies value locking attribute values of $R_{tu}$.

If the data server module 12 determines (at 402) that the transaction does not involve both a read and write of the join view JV, then the data server module 12 determines (at 410) if the transaction involves a read (but not a write) of JV. If so, then the data server module 12 checks (at 412) for any conflicting locks placed on the base relations $R_1, R_2, \ldots, R_n$. If a conflict is present, lock conflict processing is performed (at 406). If no conflicting lock exist, then the data server module 12 places (at 414) a table-level S lock on each base relation $R_i(1 \leq i \leq n)$ of JV. Note that the required table-level S lock on each base relation would conflict with an X lock or IX lock placed on any of the base relations.

The requirement (by the no-lock locking mechanism) of an S lock on each base relation of JV for a transaction that reads the JV differs from that of the Y-lock locking mechanism. In the Y-lock context, to read JV, only a Y lock is needed on JV, with no S locks needed on the base relations. Therefore, for reads of JV, the Y-lock locking mechanism requires fewer locks than the no-lock locking mechanism.

If, however, the data server module 12 determines (at 416) that the transaction involves a write (but not a read) of the join view JV through updating one or several base relations $R_{t1}, R_{t2}, \ldots, R_{th}$ ($\{t_1, t_2, \ldots, t_h\} \subseteq (1, 2, \ldots, n\})$ of JV, then the data server module 12 checks (at 418) for conflicting locks on any of the base relations. If no conflicting locks are present, then the data server module 12 places (at 420) an X lock or IX lock on each base relation $R_{tu}(1 \leq u \leq h)$ being updated. An X lock is placed if a table-write of $R_{tu}$ is needed. An IX lock is placed if a value-write of $R_{tu}$ is performed. In addition, the data server module 12 places an S lock or IS lock on each other base relation $R_j(j \in \{1, 2, \ldots, n\} - \{t_1, t_2, \ldots, t_h\})$ based on whether a table-read or value-read of $R_j$ is performed.

A value-write or value-read is a write or read requested by a query with a WHERE clause condition that specifies a specific value or values for the value locking attribute of the base relation. An example query that specifies a value-write is as follows:

UPDATE A
SET A.f=A.f+1
WHERE A.e=2;

where A.e is the value locking attribute of base relation A.

On the other hand, a table-write or table-read is a write or read requested by a query with a WHERE clause condition that does not specify a specific value or values for the value locking attribute of the base relation. An example query that specifies a table-read is as follows:

SELECT *
FROM A
WHERE A.f=2;

where A.f is not the value locking attribute of base relation A.

If $h \geq 2$, which means that more than one base relation $R_{tu}$ is being updated, then an IX lock placed on each $R_{tu}$ may need to be changed to an SIX lock (S+IX). Placing the extra S lock on each $R_{tu}$ is needed because when one base relation (e.g., $R_{t1}$) is being updated, then all other base relations on which JV is based are read for join view maintenance.

Similarly, when $R_{t2}$ is being updated, then all the other base relations (including $R_{t1}$) are read for join view maintenance.

The no-lock locking mechanism requires fewer locks than the Y-lock locking mechanism for transactions that cause the join view JV to be updated. In the Y-lock context, for updates of JV, a Y lock is placed on JV along with an X lock (or IX lock) on each updated base relation and an S lock on each non-updated base relation. On the other hand, in the no-lock context, for updates of JV, no lock is placed on JV, with an X lock (or IX lock or SIX lock) placed on each updated base relation and an S lock placed on each non-updated base relation.

The no-lock locking mechanism for join views can be extended to allow value locks on join views. Consider a join view JV defined on base relations $R_1, R_2, \ldots,$ and $R_n$. For a fixed i ($1 \leq i \leq n$), suppose that $R_i.a_i$ is the value locking attribute of base relation $R_i$ that also appears in JV. Then value locking on $R_i.a_i$ for JV is allowed. However, note that no lock is placed on JV according to the no-lock locking mechanism.

If transaction T reads JV by specifying $R_i.a_i$ value(s), then transaction T places an IS lock on $R_i$, one or several S value locks on $R_i.a_i$ for $R_i$ (not JV), and an S lock on each other base relation $R_j$ ($j \neq i$, $1 \leq j \leq n$) of JV. If transaction T both updates base relation $R_i$ by specifying the $R_i.a_i$ value(s) and reads JV, an SIX lock is placed on $R_i$, one or several X value locks are placed on $R_i.a_i$ for $R_i$, and an S lock is placed on each other base relation $R_j$ ($j \neq i$, $1 \leq j \leq n$) of JV.

The W value lock mode is also used with the no-lock locking mechanism to prevent the undesirable situation in which multiple tuples belonging to the same group are inserted as separate tuples into the aggregate join view AJV instead of a single aggregated tuple. In this case, for the aggregate join view AJV, the short-term W value lock is released immediately after the transaction integrates the join result tuple into AJV.

The no-lock locking mechanism also applies to single-table (aggregate) materialized views. Compared to the Y locking mechanism, the no-lock locking mechanism requires fewer locks when materialized views are updated. However, the no-lock locking mechanism requires more locks when materialized views are read. Thus, depending on the workload, either the Y-lock locking mechanism or the no-lock locking mechanism is selected. If the workload is read-intensive, the Y-lock locking mechanism is selected. If the workload is write-intensive, the no-lock locking mechanism is selected.

VI. Isolation Property of No-Lock Locking Mechanism

To show that the no-lock locking mechanism maintains the isolation properly (serializability) of transactions, the same four assertions as for the Y-lock locking mechanism are proven. It is assumed that join view JV allows duplicate tuples. If no duplicate tuples are allowed in JV, assume that each tuple in JV has a dupcnt attribute (or some other named parameter) recording the number of copies of the tuple. The following assumptions are made (the other more complex cases can be proved in a similar way): (1) any transaction T updates at most one base relation of JV; and (2) if transaction T tries to update base relation $R_i$($1 \leq i \leq n$), it places an S lock on each $R_j$($1 \leq j \leq n$, $j \neq i$).

If transaction T writes join view JV, T places a table-level IX or X lock on the base relation being updated until T completes. Thus transaction T's writes to join view JV are not read by any other transaction T' until transaction T completes, since T' requires a table-level S lock (or X lock if T' tries to both read and update JV) on each base relation of JV. This proves the first part of Assertion 1.

In addition, if transaction T writes join view JV, there are two possible cases:

Case 1: Transaction T both reads and updates join view JV. Transaction T places a table-level X lock on the base relation being updated and an S lock on each other base relation of JV until T completes. These X and S locks will block other transactions from writing JV (by blocking other IX or X lock requests on the base relations of JV).

Case 2: Transaction T updates the base relation $R_i$($1 \leq i \leq n$). This is similar to the proof in the Y-lock context.

Thus transaction T's writes to join view JV are not written by any other transaction T' until transaction T completes (this proves the second part of Assertion 1).

Based on a similar reasoning to the proof of Assertion 1, transaction T does not overwrite dirty data of other transactions in join view JV (this proves Assertion 2).

Suppose that transaction T reads join view JV by requiring a table-level S lock on each base relation of the join view JV. If some other transaction T' writes any data in join view JV, T' will place a table-level IX or X lock on the base relation being updated until T' completes. Thus transaction T does not read dirty data from transaction T' in join view JV (this proves Assertion 3). The case that transaction T tries to both read and update the join view JV is similarly proved.

If transaction T reads join view JV, T places a table-level S lock on each base relation of the join view JV until T completes. Thus no other transaction T' can write any data in JV until transaction T completes, since T' requires a table-level IX or X lock on the base relation being updated (this proves Assertion 4). The case that transaction T tries to both read and update the join view JV is similarly proved.

Similar to the Y-lock locking mechanism, the no-lock locking mechanism can also be used for aggregate join views.

Since multiple transactions may also be able to update a join view JV concurrently using the no-lock locking mechanism, a logical undo mechanism similar to that discussed for the Y-lock mechanism is used in case a transaction aborts.

VII. System Environment

Instructions of the various software routines or modules discussed herein (such as the parsing engine, data server modules, lock managers, and so forth) are stored on one or more storage devices in the corresponding systems and loaded for execution on corresponding control units or processors. The control units or processors include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the various software routines or modules) are stored in respective storage devices, which are implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The instructions of the software routines or modules are loaded or transported to each system in one of many different ways. For example, code segments including instructions stored on floppy disks, CD or DVD media, a hard disk, or transported through a network interface card, modem, or other interface device are loaded into the system and executed as corresponding software modules or layers. In the loading or transport process, data signals that are embodied in carrier waves (transmitted over telephone lines, network lines, wireless links, cables, and the like) communicate the code segments, including instructions, to the system. Such carrier waves are in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of updating an aggregate view in a database system, comprising: providing an initial instance of a predefined first lock for placing on the aggregate view, the initial instance of the predefined first lock conflicting with a shared lock and an exclusive lock placed on the aggregate view, but not conflicting with an additional instance of the predefined first lock placed on the aggregate view;
   receiving a first transaction that causes a first tuple to be integrated into the aggregate view; and
   in response to the first transaction, placing an initial instance of a predefined second lock on the aggregate view, the initial instance of the predefined second lock conflicting with any one of a shared lock, exclusive lock, and an additional instance of the predefined second lock placed on the aggregate view, but not conflicting with the initial instance or the additional instance of the predefined first lock placed on the aggregate view,
   wherein the predefined first lock and predefined second lock are different types of locks; and;
   whereby each of the predefined first lock and predefined second lock differ in lock type from either a shared lock and an exclusive lock; and
   wherein the predefined first lock comprises a Y lock, and the predefined second lock comprises a W lock.

2. The method of claim 1, wherein placing the initial instance of the predefined second lock on the aggregate view comprises placing the initial instance of the predefined second lock on a first value of a locking attribute.

3. The method of claim 2, further comprising:
   receiving a second transaction that causes a second tuple to be integrated into the aggregate view;
   determining if a requested predefined second lock for the second transaction conflicts with the initial instance of the predefined second lock for the first transaction; and
   if no conflict exists, placing a requested instance of the predefined second lock for the second transaction on a second value of a locking attribute.

4. The method of claim 3, wherein determining if the requested predefined second lock for the second transaction conflicts with the initial instance of the predefined second lock for the first transaction comprises checking if a locking attribute value in the second tuple is the same as a locking attribute value in the first tuple.

5. The method of claim 3, further comprising determining if the requested predefined second lock for the second transaction conflicts with any one of a shared lock and exclusive lock placed on the aggregate view.

6. The method of claim 1, further comprising:
   storing base relations and the aggregate view; and
   defining the aggregate view as an aggregate join view on the base relations.

7. The method of claim 1, wherein the initial instance of the predefined second lock comprises an initial instance of a predefined second value lock that is placed on a first value of a locking attribute.

8. The method of claim 7, wherein the initial instance of the predefined second value lock conflicts with an additional instance of the predefined second value lock on the first value of the locking attribute.

9. The method of claim 8, wherein the initial instance and the additional instance of the predefined second value lock conflicts with either a table-level shared lock or a shared value lock placed on the first value of the locking attribute.

10. The method of claim 9, wherein the initial instance and the additional instance of the predefined second value lock conflicts with either a table-level exclusive lock or an exclusive value lock placed on the first value of the locking attribute.

11. The method of claim 10, wherein the initial instance of the predefined first lock comprises an initial instance of a predefined first value lock placed on the first value of the locking attribute, and wherein the initial instance of the predefined second value lock does not conflict with the initial instance of the predefined first value lock placed on the first value of the locking attribute.

12. The method of claim 1, further comprising placing the initial instance of the predefined first lock on the aggregate view in response to another transaction that deletes a tuple from the aggregate view.

13. A database system comprising:
   a storage to store an aggregate view; and
   a controller to provide locks for placing on the aggregate view, the locks comprising a predefined first lock, a predefined second lock, and an exclusive lock,
   an initial instance of the predefined first lock on the aggregate view conflicting with the exclusive lock but not with an initial instance of the predefined second lock and an additional instance of the predefined first lock on the aggregate view,
   the initial instance of the predefined second lock conflicting with the exclusive lock and an additional instance of predefined second lock placed on the aggregate view, but not conflicting with the initial instance and the additional instance of the predefined first lock placed on the aggregate view,
   the controller to place the initial instance of the predefined second lock on the aggregate view in response to a first transaction that causes a first tuple to be integrated into the aggregate view; and
   whereby each of the predefined first lock and the predefined second lock differ in lock type from a shared lock and an exclusive lock; and
   wherein the predefined first lock comprises a Y lock, and the predefined second lock comprises a W lock.

14. The database system of claim 13, wherein the locks further comprise a shared lock, each of the predefined first and second locks conflicting with the shared lock.

15. The database system of claim 13, wherein the initial instance of the predefined second lock comprises an initial interest of a predefined second value lock on a value of a locking attribute.

16. The database system of claim 15, in response to a second transaction that causes a second tuple to be integrated into the aggregate view, the controller to determine if a requested predefined second lock for the second transaction conflicts with the initial instance of the predefined second lock for the first transaction, and if no conflict exists, to place a requested instance of the predefined second lock for the second transaction on another value of a locking attribute.

17. The database system of claim 16, wherein the controller determines if the requested predefined second lock for the second transaction conflicts with the initial instance of the predefined second lock for the first transaction by checking if a locking attribute value in the second tuple is the same as a locking attribute value in the first tuple.

18. The database system of claim 16, the controller to further determine if the requested predefined second lock for the second transaction conflicts with any one of a shared lock and exclusive lock placed on the aggregate view.

19. The database system of claim 13, the storage to further store base relations and the aggregate view, and the controller to further define the aggregate view as an aggregate join view on the base relations.

20. The database system of claim 13, wherein the predefined second lock comprises a predefined second value lock, wherein an initial instance of the predefined second value lock is placed on a first value of a locking attribute.

21. The database system of claim 20, wherein the initial instance of the predefined second value lock conflicts with an additional instance of the predefined second value lock on the first value of the locking attribute.

22. The database system of claim 21, wherein the initial instance of the predefined second value lock conflicts with either a table-level shared lock or a shared value lock placed on the first value of the locking attribute.

23. The database system of claim 22, wherein the initial instance of the predefined second value lock conflicts with either a table-level exclusive lock or an exclusive value lock placed on the first value of the locking attribute.

24. The database system of claim 20, wherein the initial instance of the predefined first lock comprises a predefined first value lock placed on the first value of the locking attribute, and wherein the initial instance of the predefined second value lock does not conflict with the predefined first value lock placed on the first value of the locking attribute.

25. The database system of claim 13, the controller to further place the additional instance of the predefined first lock on the aggregate view in response to another transaction that deletes a tuple from the aggregate view.

26. The database system of claim 13, wherein the controller comprises one or plural access modules to manage access of data stored in the storage, the storage comprising plural storage modules corresponding to the access modules.

27. An article comprising at least one non-volatile storage medium containing instructions that when executed cause a database system to:

provide an initial instance of a predefined first lock for placing on the aggregate view, the initial instance of the predefined first lock conflicting with a shared lock and an exclusive lock placed on the aggregate view, but not conflicting with an additional instance of the predefined first lock placed on the aggregate view;

receive a first transaction that causes a first tuple to be integrated into the aggregate view; and in response, to the first transaction, place an initial instance of a predefined second lock on the aggregate view, the initial instance of the predefined second lock conflicting with any one of a shared lock, exclusive lock, and an additional instance of the predefined second lock placed on the aggregate view, but not conflicting with the initial instance or the additional instance of the predefined first lock placed on the aggregate view, wherein the predefined first lock and predefined second lock are different types of locks;

whereby each of the predefined first lock and predefined second lock differ in lock type from a shared lock and an exclusive lock; and wherein the predefined first lock comprises a Y lock, and the predefined second lock comprises a W lock.

28. The article of claim 27, wherein placing the initial instance of the predefined second lock on the aggregate view comprises placing the initial instance of the predefined second lock on a first value of a locking attribute.

29. The article of claim 28, wherein the instructions when executed cause the database system to further:

receive a second transaction that causes a second tuple to be integrated into the aggregate view;

determine if a requested predefined second lock for the second transaction conflicts with the initial instance of the predefined second lock for the first transaction; and if no conflict exists, place a requested instance of the predefined second lock for the second transaction on a second value of a locking attribute.

30. The article of claim 29, wherein determining if the requested predefined second lock for the second transaction conflicts with the initial instance of the predefined second lock for the first transaction comprises checking if a locking attribute value in the second tuple is the same as a locking attribute value in the first tuple.

31. The article of claim 29, wherein the instructions when executed cause the database system to further determine if the requested predefined second lock for the second transaction conflicts with any one of a shared lock and exclusive lock placed on the aggregate view.

* * * * *